(12) United States Patent
Lippman

(10) Patent No.: US 7,898,599 B2
(45) Date of Patent: *Mar. 1, 2011

(54) AUTOMATED INVERSE TELECINE CONVERSION

(75) Inventor: Alan Francis Lippman, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/080,528

(22) Filed: Apr. 2, 2008

(65) Prior Publication Data

US 2008/0211965 A1 Sep. 4, 2008

Related U.S. Application Data

(63) Continuation of application No. 10/806,597, filed on Mar. 23, 2004, now Pat. No. 7,369,179, which is a continuation of application No. 09/732,217, filed on Dec. 6, 2000, now Pat. No. 6,724,433.

(51) Int. Cl.
*H04N 5/46* (2006.01)
(52) U.S. Cl. ............ 348/558; 348/443; 348/452; 348/97
(58) Field of Classification Search .................. 348/558, 348/441, 443, 446, 458–459, 452, 415, 439, 348/94–99, 701, 526, 604, 449, 911; *H04N 5/46*
See application file for complete search history.

(56) References Cited

U.S. PATENT DOCUMENTS

| | | | |
|---|---|---|---|
| 5,742,343 A | 4/1998 | Haskell et al. | |
| 5,812,202 A | 9/1998 | Ng et al. | |
| 5,828,786 A | 10/1998 | Rao et al. | |
| 5,892,550 A | 4/1999 | Iwasaki et al. | |
| 6,115,499 A | 9/2000 | Wang et al. | |
| 6,449,015 B1 | 9/2002 | Sugaya | |
| 6,466,624 B1* | 10/2002 | Fogg ........................ | 375/240.27 |
| 6,469,745 B1 | 10/2002 | Yamada et al. | |
| 6,469,765 B1 | 10/2002 | Matsuyama et al. | |
| 6,538,688 B1 | 3/2003 | Giles | |
| 6,559,890 B1* | 5/2003 | Holland et al. ............... | 348/441 |

* cited by examiner

*Primary Examiner* — Trang U Tran
(74) *Attorney, Agent, or Firm* — AEON Law; Adam L. K. Philipp

(57) ABSTRACT

The present invention is generally directed to automated methods and systems for converting image streams having a first frame rate to a second frame rate without the need for user intervention. Embodiments of the present invention obviate the effects of processing of a telecine process. In one embodiment, where frames are encoded by a single video field, a statistical analysis of the differences between adjacent frames reveals a telecine pattern, thereby identifying which frames to remove. In another embodiment, where frames are encoded by even and odd video fields, which are interleaved to produce the frame, a statistical analysis of the differences between adjacent fields reveals the telecine pattern, identifies which frames to remove, and identifies frames that are candidates for re-interleaving.

38 Claims, 18 Drawing Sheets

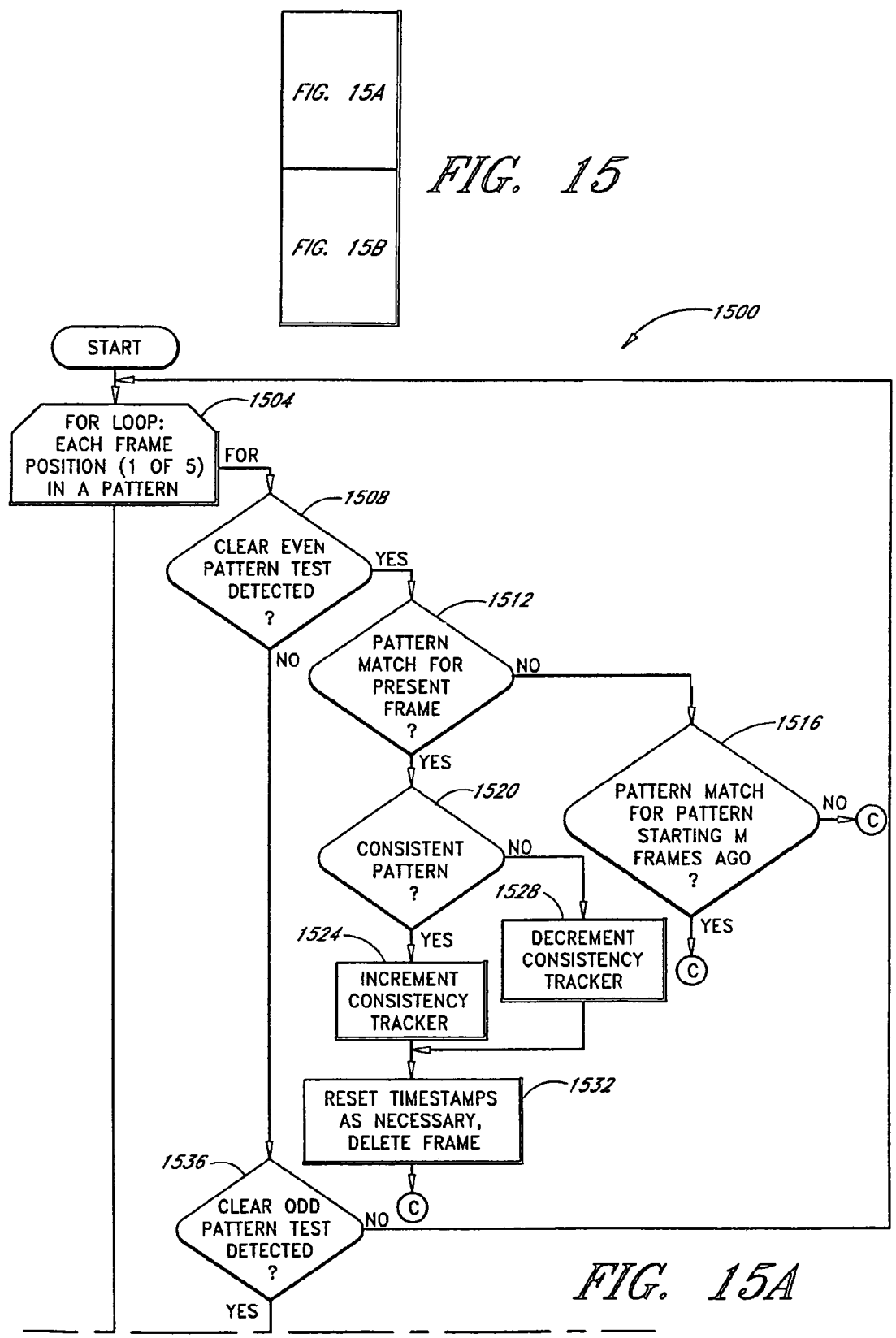

AUTOMATED INVERSE TELECINE CONVERSION

RELATED APPLICATION

This application is a Continuation of and claims priority from U.S. application Ser. No. 10/806,597 filed Mar. 23, 2004, entitled "AUTOMATED INVERSE TELECINE CONVERSION", now U.S. Pat. No. 7,369,179, issued May 6, 2008, herewith, which is a Continuation of U.S. application Ser. No. 09/732,217, filed Dec. 6, 2000, entitled "AUTOMATED INVERSE TELECINE CONVERSION", now U.S. Pat. No. 6,724,433, issued Apr. 20, 2004; the contents of which are incorporated by reference herein.

BACKGROUND OF THE INVENTION

1. Field of the Invention

The present invention is related to processing image sequences, and in particular, to methods and systems for converting an image sequence intended to be displayed at a first frame rate to an image sequence intended to be displayed at a second frame rate.

2. Background

As is well known, motion film is typically exposed and viewed at 24 film frames per second (fps). By contrast, NTSC video, which applies to television, is typically recorded and played back at 29.97 video fps. The selection of 29.97 fps for video is based on the frequency of electricity in the United States, which is 59.94 Hertz (Hz) or cycles per second. Video typically includes two fields per frame, and therefore, there are typically 59.94 fields per second.

For television, the NTSC color video standard specifies that 525 lines of information are scanned at a rate of 29.97 fps, therefore, each field scans 262.5 horizontal lines. However, typically only approximately 480 lines per frame, or 240 lines per field, are active or illuminated and contain actual picture information. The two fields of a video frame are often referred to as being "interlaced." The lines of information from the two fields of a respective frame interlace, i.e., alternate, to produce the frame. Thus, one field can contain the odd lines of a frame and the other field can contain the even lines of a frame. The two fields are also respectively referred to as "odd" and "even" fields. In addition, the NTSC video standard is not always used. Many users use proprietary standards that are similar to the NTSC video standard. For example, where a frame is encoded by only one field, the resulting video sequence can include frames with 240 lines of resolution at 60 frames per second or 240 lines of resolution at 30 frames per second.

It is a common practice in the movie and television industry to convert from the film format to the NTSC video format so that filmed works can be broadcast and displayed on a television set. Clips of filmed work are also often transferred to a video format, such as the NTSC video format, because video formats are convenient to store and view as well. Such a conversion is known as a "telecine" process, which typically converts 24 film fps to 30 video fps video (in addition to the resizing or letterboxing to accommodate the difference in screen aspect ratio).

To convert 24 fps of film to 30 fps of NTSC video, duplicate or repeated fields are inserted to "pad" the 24 fps to 30 fps. The first film frame is converted into 2 video fields (1 even field and 1 odd field), the second film frame is converted into 3 video fields (2 even fields and 1 odd field), with two of the video fields being the same, the third film frame is converted into 2 video fields, the fourth film frame is converted into 3 video fields, with two of the video fields being the same, and so on. Thus, the video field to film frame pattern is "2, 3, 2, 3," where an extra video field is inserted for every other film frame. As a result, 4 frames of film convert to 5 corresponding frames of video. This is referred to as a "three-two (3:2) pull down." To return the 30 fps of video to the original 24 fps of film, a reverse process, termed inverse telecine, is performed, where frames of video convert to 4 corresponding frames of video. Prior methods rely extensively on manual intervention to perform the inverse telecine process.

One significant difficulty encountered in performing inverse telecine is handling edits, slow motion, special effects sequences, or other special cases, wherein the 2, 3, 2, 3 pattern is interrupted. For example, because of an edit or abort during final assembly, the 2, 3, 2, 3 pattern may be interrupted in the middle and restarted as follows 2,3,2,[edit] 2, 3, 2, 3. To correctly return or convert this pattern to the original film pattern, a user locates the pattern break and conventionally resynchronizes the sequence by manually deleting one or more fields. This is a time consuming and expensive process, and in particular, makes difficult the accurate performance of the inverse telecine process on a large number of video clips in a short period of time.

Because of the difficulties encountered in performing the inverse telecine process, the video format is often retained when displaying a clip on a computer. However, the video format can be wasteful because the duplicate frames needlessly occupy bandwidth. Further, the display of duplicate frames causes motion in the clip to transition in a jerky or erratic manner. In addition, where video fields are interlaced, the interlacing of fields based on film frames from different times can produce artifacts, which are visible on a progressively scanned monitor, such as a computer video monitor.

SUMMARY OF THE INVENTION

The present invention is generally directed to automated methods and systems for converting image streams having a first frame rate to a second frame rate without the need for user intervention. Embodiments of the present invention obviate the effects of a telecine process, wherein additional frames are added to accomplish the frame rate conversion. In one embodiment, a statistical analysis of the differences between pixels in adjacent frames or groups of frames is performed to detect a telecine pattern, thereby identifying which frames to remove.

In another embodiment, where frames are encoded using both even and odd video fields, a statistical analysis of the differences between adjacent fields detects the telecine pattern, identifies which frames to remove, and identifies frames that are candidates for re-interleaving. The novel process disclosed herein can detect and delete the duplicate frames of the telecine process for video sequences with interlaced or non-interlaced frames, and/or of various resolutions.

Video image streams are frequently converted from a film format to a video format through a process known as a telecine process. Although the telecine process allows a sequence originally taken in film at 24 fps to be stored in a video format at 30 fps and displayed on a television monitor, the process typically results in duplicative frames, jittery motion, and interleaving of disparate frames. By providing a technique to automatically perform an inverse telecine process to substantially return the sequence to the film format, the picture quality improves and the bandwidth needed to transmit the processed sequence is reduced.

The techniques for performing the automated inverse telecine processes can be implemented in a server connected to the Internet or other network. The Internet allows a variety of users to communicate with the server. A user can upload, in real time or from a storage device, a first video sequence to the server. The server processes the uploaded video sequence either substantially in real time or in the background. While processing in real time or after processing in the background, users can download the processed video sequence from the server.

In addition, one embodiment of the present invention automatically detects whether the incoming video sequence is encoded in a single field or in multiple fields by counting the number of lines per frame and comparing the count to a predetermined amount.

Where the frames have been encoded in single fields, i.e., wherein a frame is composed of one field, the process computes comparisons of the adjacent frames in the sequence. The comparison can be made on all the pixels of each frame, or on a portion of the pixels, such as every other pixel, every fourth pixel, or some other interval of pixels. A history of the comparisons is maintained. One embodiment compares both the luminance and the chrominance components of a pixel. Another embodiment compares only the luminance component.

The pixels can be compared in a variety of ways. For example, the computation of the comparison can include summations of the absolute differences between pixels, summations of the squares of differences between pixels, and the like. In one embodiment, the summation is further normalized with respect to the number of pixels per frame compared. One embodiment further saturates the comparison to a predetermined amount such that a relatively large difference between frames, such as may be encountered due to an edit, does not unduly impact later statistical analysis.

In one embodiment of the collection, the collection maintains the most recent comparisons made. When a new frame is received and a new comparison is computed, the results of the new comparison are entered into the collection. In addition, the process can detect the presence of dropped frames in the sequence of frames and fill the collection with default histories or provide another indication, such as a separate collection that maintains an indication of validity. By compensating for dropped frames, the process preserves the ability to detect the telecine pattern despite the presence of the dropped frames.

The process statistically analyzes the entries in the collection to detect the telecine pattern. The entries in the collection are further grouped into at least two groups for the statistical analysis. A first group includes comparisons between frames where the comparisons were made about 5 frame positions apart. A second group includes comparisons of at least a portion of the other frames. The statistical analysis can include computations such as means, variances, and standard deviations. In one embodiment, the statistical analysis of the first group and the second group are compared to predetermined amounts. In another embodiment, the statistical analysis of the first group is compared relative to the statistical analysis of the second group or a combination of relative comparison and comparison to predetermined amounts. Where the comparison of the statistical analysis indicates that the differences in the first group are relatively low, then the telecine pattern is detected.

One embodiment of the present invention can rotatably search for the telecine pattern in the 5 frame positions possible in the 3:2 telecine pattern. Where the telecine pattern is found and the frame of interest is found to conform to the duplicate frame in the telecine pattern, the frame is deleted. Where the telecine pattern is found, but the position of the frame of interest is outside the position of the duplicate frame of the telecine pattern, the frame is not deleted and the process continues to process other frames.

The remaining frames of the sequence are re-aligned as necessary so that the remaining frames are substantially evenly spaced across intervals defined by the film frame rate of 24 frames per second (fps). Such realignment can be accomplished by, for example, modifying the timestamps associated with the frames.

In one embodiment, where detection of the telecine pattern fails, progressively smaller and smaller subsets of the collection are analyzed to continue to search for the telecine pattern. For example, in a first iteration, the process can analyze the most recent 20 histories in the collection. Upon a failure to detect a telecine pattern in the 20 histories, the process can proceed to analyze the most recent 15 histories in the collection, and so on.

One embodiment further varies the thresholds used with the statistical analysis to detect the telecine pattern in accordance with the size of the portion of the collection searched. For example, where progressively smaller subsets of the collection are searched, the thresholds can be raised to provide protection against false detection.

One embodiment further includes a fail safe mode to maintain the deletion of frames in the absence of a detected telecine pattern. For example, where a portion of the sequence of frames is in slow motion, or the portion of the sequence of frames corresponds to a relatively static scenery shot, the difference between one frame and its adjacent frame is relatively low and the telecine pattern can be difficult to detect. Where a telecine pattern has been observed in the past, the fail safe mode can remove a frame consistent with the previously observed telecine pattern to continue to convert and return the frame sequence from the video format back to its original film format.

One embodiment further includes detection of redundant frames that were replicated to raise the frame rate from 29.97 fps to 30 fps. These redundant frames are substantially identical to an adjacent frame. In one embodiment, a redundant frame is detected when the process determines that there is no difference between the frame and an adjacent frame. The process can further condition the removal of the detected redundant frame based on a predetermined frame rate and a predetermined interval between removal of redundant frames.

A similar process is used to convert a sequence of frames, where a frame from the sequence of frames is interlaced in multiple video fields. In a typical interlaced video frame, the odd and the even fields of the frame combine, or interlace, to produce the video frame. For example, the even lines of a frame are contributed by an even field and the odd lines of a frame are contributed by an odd field.

Where the frames have been encoded in multiple fields, the process performs comparisons of the adjacent fields in the sequence. Again, the comparison can be made on all the pixels of each frame, or on selected pixels. A history of the comparisons between fields is maintained in a collection. One embodiment identifiably maintains the history of the comparisons of the even fields separate from the history of the comparisons of the odd fields.

The process again statistically analyzes the entries in the collection to detect the telecine pattern. The entries in the collection are further grouped into at least four groups for the statistical analysis. The four groups are separated based on whether the entry in the collection is associated with even fields or odd fields, and whether the entry belongs to a first group or a second group. A telecine pattern, if one exists in the collection, manifests itself about once every 5 frame positions. The first group includes comparisons of fields that are evenly spaced 5 frames apart. The frame position for the first group also varies in accordance to whether the field comparisons are associated with the even fields or the odd fields. In one embodiment, the frame positions of the even and the odd field comparisons are offset by 2 frame positions (in modulo 5 arithmetic).

The statistical analysis described in connection with the single field encoded video frame sequence can be applied to the multiple field encoded video frame sequence. When a frame matches the telecine pattern indicated by the statistical analysis of the fields, the frame is deleted from the sequence and the remaining frames time aligned according to a film frame rate. Where the frame deleted has a duplicate even field, the process invokes an interleaving process to interleave odd fields of frames where appropriate. Likewise, where the frame deleted has a duplicate odd field, the process invokes an interleaving process to interleave even fields of frames as appropriate.

Frames other than the frame with the identified telecine pattern can be inspected for re-interleaving. For example, the frame prior to the frame with the identified telecine pattern may have captured two disparate film frames in its even and odd fields. For example, the even field of the frame is compared with the odd field of the frame, and the even field of the frame is compared with the odd field of an adjacent frame. Where the comparisons indicate more similarity between the even field of the frame and the odd field of the adjacent frame, the odd field of the adjacent frame is substituted to re-interleave the frame. By re-interleaving the fields, the artifacts of viewing two disparate fields on a progressively scanned monitor are eliminated. Moreover, the re-interleaving allows the identified duplicate frame to be removed from the sequence with little or no loss of information.

Again, the process can rotatably search for the telecine pattern in the 5 frame positions possible in the 3:2 telecine pattern. After removal of duplicate frames, the remaining frames of the sequence are re-aligned as necessary so that the remaining frames are substantially evenly spaced across intervals defined by the film frame rate of 24 frames per second (fps). Again, the portion of the collection searched to detect the telecine pattern can be varied to detect the telecine pattern. The comparisons used to detect the telecine pattern can vary with respect to the extent of the history search to desensitize the system against a false detection of the telecine pattern.

The multiple-field inverse telecine process can also include the fail safe mode described in connection with the single-field inverse telecine process. The fail safe mode allows the inverse telecine process to continue to convert the sequence of video frames even where the telecine pattern is difficult to detect. Again, the multiple-field inverse telecine process can optionally include detection and removal of the redundant frames that are the result of a conversion from a 29.97 fps frame rate to a 30 fps frame rate that is found on some video sequences.

The automated inverse telecine process may be performed on video uploaded to a Web site server by users. Once a user uploads the video, an inverse telecine module executing in the server deletes the pulldown fields and produces appropriate de-interlaced frames. These frames may then be downloaded or streamed over a network, such as the Internet, to networked terminals, such as progressively scanned monitors, for viewing.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

DETAILED DESCRIPTION OF PREFERRED EMBODIMENTS

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

Throughout the following detailed description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together.

Furthermore, while the following description relates to an embodiment utilizing the Internet and related protocols, other networks and other protocols may be used as well. In addition, unless otherwise indicated, the functions described herein are preferably performed by executable code running on one or more general purpose computers or on servers.

Embodiments of the present invention obviate the effects of a telecine process, wherein additional frames are added to accomplish the frame rate conversion, without the need for user intervention. The differences between pixels of adjacent frames are computed and collected, a statistical analysis of the differences is performed to detect a telecine pattern thereby identifying the duplicate frames of the telecine process, and the duplicate frames are removed from the sequence. Advantageously, the techniques disclosed herein can detect and delete the duplicate frames of the telecine process for video sequences with interlaced or non-interlaced frames, and/or of varying resolutions.

Figure 1:
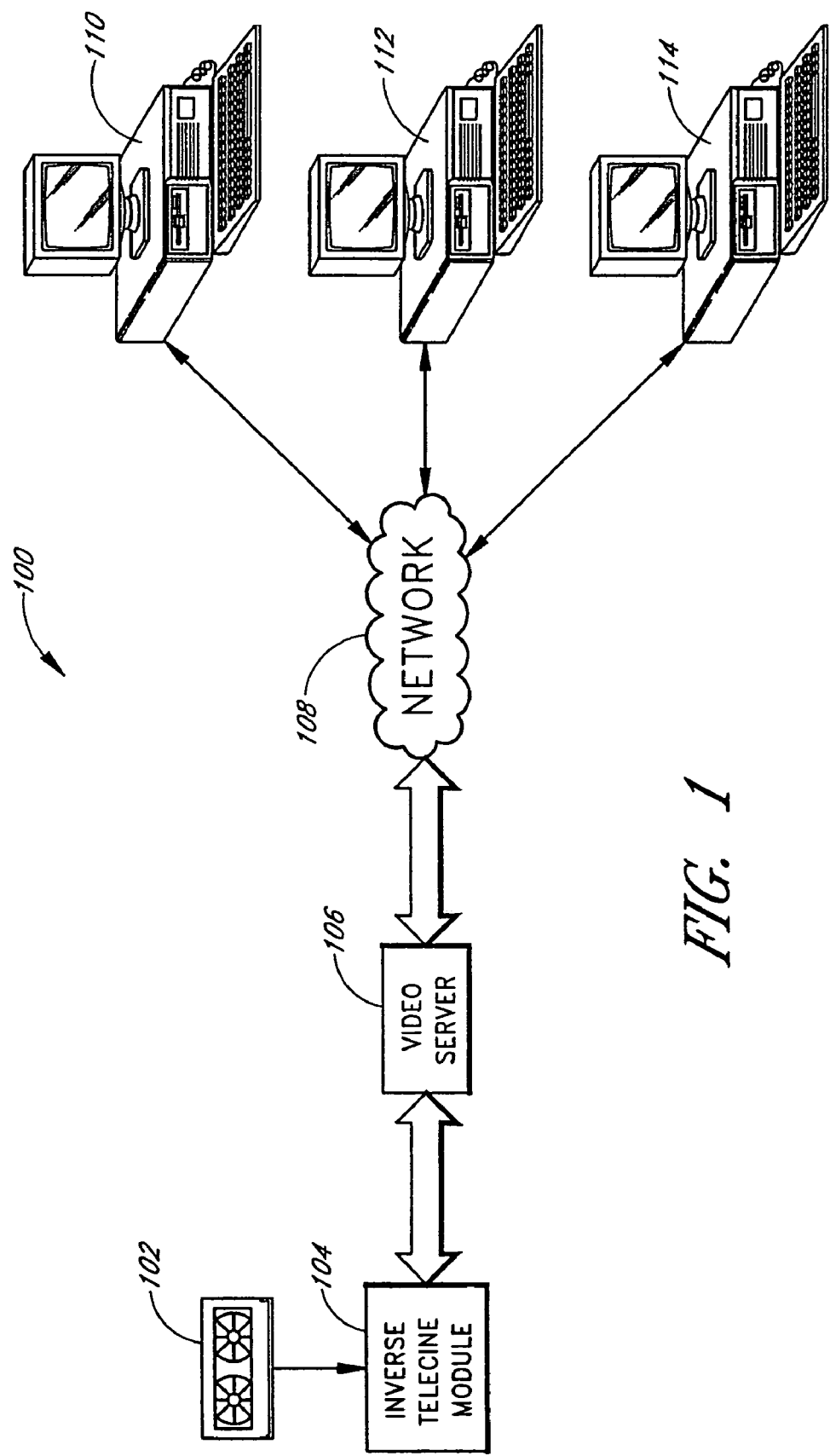
FIG. 1 illustrates an exemplary networked system, including Web components, for implementing an image sequence processing system in accordance with one embodiment of the invention and illustrates typical user components for accessing the system.

FIG. 1 illustrates an exemplary networked system 100 that can implement an inverse telecine processing system according to one embodiment of the present invention. The system 100 includes a video source 102, an inverse telecine module 104, a video server 106, a network 108, and multiple viewing terminals 110, 112, 114.

The video source 102 includes any source that can provide a video clip, such as a portion of a movie. For example, the video source 102 can include a television receiver that is receiving a live broadcast over the air, by satellite, or via a cable. The video source 102 can further include video tapes in both analog and digital formats, DVD players, laserdisc players, and can include personal computers or servers with video content stored in disk drives or optical drives. Of course, the personal computer or server with the video content can be located remotely and accessed via a network.

The inverse telecine module 104 is coupled, via a direct connection or via a network, such as the Internet, to the video source 102 to receive the video clip. The video source 102 converts the video clip, which is typically in a 30 fps video format, and restores the 24 fps format of the original film. In one embodiment, the inverse telecine module 104 is implemented as a computer program and executes on the video server 106. However, it will be understood by one of ordinary skill in the art that the inverse telecine module 104 can be implemented by dedicated hardware or by a combination of dedicated hardware and software. Further details of the inverse telecine module 104 are described later in connection with FIGS. 4 to 17.

The video server 106 includes standard Web servers that use connection-oriented protocols such as HTTP and Transmission Control Protocol/Internet Protocol (TCP/IP), and includes Web servers that use connectionless protocols, such as User Datagram Protocol (UDP) and Internet Packet Exchange (IPX), which allow greater throughput than connection-oriented protocols. In one embodiment, the video server 106 is adapted to stream data in accordance with Real-Time Streaming Protocol (RTSP). An exemplary video server 106 is the RealServer™ from RealNetworks, Inc.

The multiple viewing terminals 110, 112, 114 access the video server 106 via the network 108. The network 108 includes any medium suitable for the transmission of data including internal networks and external networks, private networks and public networks (such as the Internet), and wired, optical, and wireless networks. In one embodiment, the network 108 is the Internet and the multiple viewing terminals 110, 112, 114 communicate with the video server 106 with RTSP. Typically, in exchange for a monthly fee, an ISP provides access to the Internet. The ISP can provide access via many mediums including modems on phone lines, satellite communications, cable modems, DSL, etc.

In one embodiment, a viewing terminal is a personal computer equipped with a browser. However, a viewing terminal can be any microprocessor controlled device, including, but not limited to a terminal device, such as a workstation, a server, a client, a mini computer, a main-frame computer, a laptop computer, a network of individual computers, a mobile computer, a palm top computer, a hand held computer, an interactive kiosk, a personal digital assistant, an interactive wireless communications device, a mobile browser, or a combination thereof. In one embodiment, the viewing terminal is configurable so that at least a portion of the viewing terminal that displays a video clip can update the display or "blit" the frames at a 24 frame per second rate.

The browser may be a standard browser such as the Netscape® Navigator developed by Netscape, Inc. or the Microsoft® Internet Explorer developed by Microsoft Corporation. In one embodiment, the inverse telecine module 104 is a plug in for the browser. One of ordinary skill in the art will realize that other types of access software could also be used to implement the functionality of a browser. The other types of access software could be, by way of example, other types of Internet browsers, custom network browsers, two-way communications software, cable modem software, point-to-point software, custom emulation programs, and the like.

Figure 2:
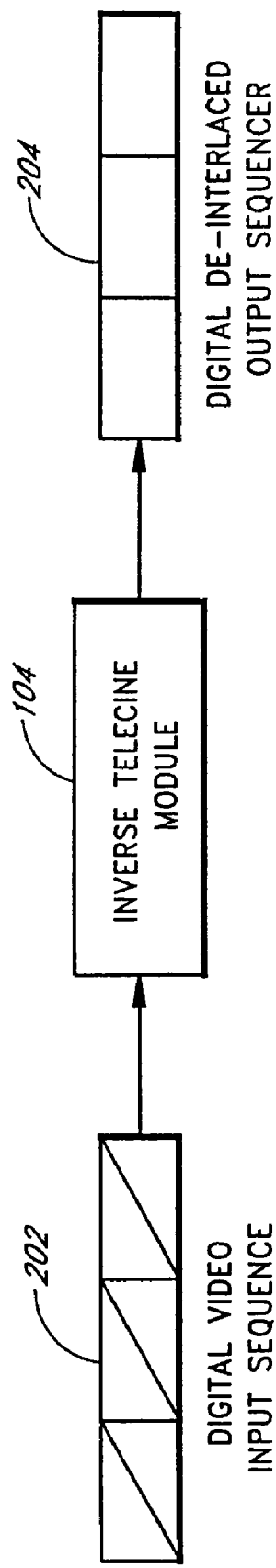
FIG. 2 illustrates an exemplary process performed by the image sequence processing system illustrated in FIG. 1.

FIG. 2 illustrates an example of the functionality of the inverse telecine module 104. The inverse telecine module 104 receives a sequence of digital video frames 202 at a video frame rate such as, for example, 29.97 Hertz (Hz) or 30 Hz. The inverse telecine module 104 processes the sequence of frames 202, which are sequenced at the video frame rate, to produce a sequence of frames sequenced at a film rate 204, such as 24 Hertz (Hz) or a sub-multiple thereof. In one embodiment, the inverse telecine module 104 reconstructs the sequence of frames 204, from the interlaced fields at 59.94 Hz or 60 Hz of frames at 29.97 Hz or 30 Hz, respectively, so that the sequence of frames 204 can be displayed in progressive scans (without interlacing) at the film rate.

Figure 3:
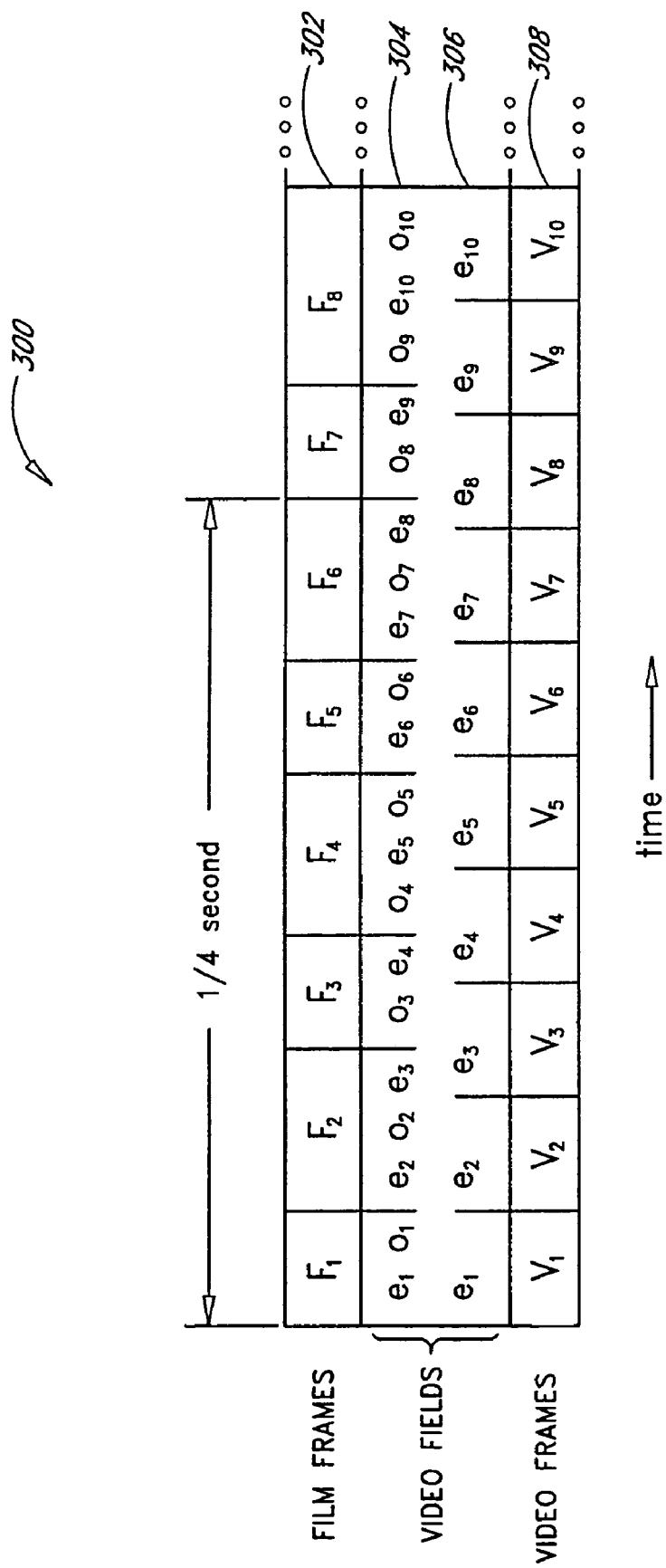
FIG. 3 illustrates a typical mapping in accordance with a telecine process.

FIG. 3 illustrates a typical mapping 300 that occurs in a telecine process (conversion from film to video) with time shown along the horizontal axis. The mapping 300 includes four rows that indicate film frames 302, even and odd video fields 304, even video fields 306, and video frames 308.

To convert from the film frame rate of 24 fps to the 30 Hz video frame rate, the film frames are sampled by the even and odd video fields 304 at about 60 Hz in a 2:3 pattern as shown in FIG. 3. It will be understood by one of ordinary skill in the art that the even and odd nomenclature is used only for reference and that typically, the even and odd fields 304 are produced by one camera, digitizer, or imager. It will also be understood by one of ordinary skill in the art that the 30 Hz rate used herein can refer to either a 30-Hz field rate or to the 29.97-Hz frame rate as specified by the NTSC standard. Similarly, the 60 Hz rate can refer to either a 60 Hz rate or to the 59.94 Hz field rate as specified by the NTSC standard. The telecine process can be performed primarily in the analog domain, where the film frames are converted to video frames, and then converted to digital. The telecine process can also be performed primarily in the digital domain, where the film frames are converted to digital, and the video frames are created digitally from the film frames.

In some telecine processes, the 24-Hz film frame rate is slowed by about 0.1% to 23.96 Hz during transfer so that the 2:3 telecine process results in the 29.97 Hz frame rates and the 59.94 Hz field rates. Of course, the telecine process and the inverse telecine process can be performed either in real time or asynchronously in a batch process. Where the film frames are converted to digital and the telecine process is performed in the digital domain, the 2:3 telecine process typically maintains the 24-Hz film frame rate and instead, skips the duplication of one video frame for every 900 video frames (30 seconds during playback) and modifies the timestamps of the remaining 899 video frames to result in the 29.97 Hz frame rate for NTSC video.

In addition, some systems further convert a video clip in a 29.97 fps video format to a 30 fps video format. Typically, a video clip in the 29.97 fps video format is converted to the 30 fps video format by copying one additional video frame out of every 899 video frames, and re-sequencing of the resulting 900 video frames per 30 second segment. This copied frame is referred to as a redundant frame herein.

Where higher resolution is desired, such as greater than 240 lines of resolution, one even and one odd field are interlaced to produce a video frame. For example, video fields $e_1$ and $o_1$ combine to produce video frame $V_1$. The video fields $e_1$ and $o_1$ are combined so that the respective rows of video fields $e_1$ and $o_1$ interlace, i.e., the even rows from frame $V_1$ are from video field $e_1$ and the odd rows from frame $V_1$ are from video field $o_1$. Such video capture is also termed multi-field capture.

Where lower resolution is desired, such as 240 lines of resolution or less, interlacing of video fields is typically not used. Rather than combine and interlace every other video field, conventionally, every other video field is ignored. Thus, the video frames include only every other video field, such as the even video fields 306. Such video capture is also termed single-field capture.

The drawbacks of display according to the video frame rate are apparent upon inspection of FIG. 3. For example, in a system configured for single-field capture at 30 Hz, the system duplicates the contents of the film frames every fourth film frame. Film frame $F_2$ is duplicated by video fields $e_2$ and $e_3$, and by corresponding video frames $V_2$ and $V_3$. Similarly, film frame $F_6$ is duplicated by video fields $e_7$ and $e_8$ and by corresponding video frames $V_7$ and $V_8$. Without an inverse telecine process, the video frames are equally spaced in time at the video rate and about every fifth video frame duplicates the contents of every fourth film frame. Where a clip shows motion, the motion intermittently stops for the duplicate frames and restarts on subsequent frames, thereby resulting in jerky or jittery motion. Further, where the video sequence is transmitted across a network, such as the Internet, the duplicate frames needlessly contribute to wasted bandwidth.

Additionally, in a system configured for multi-field capture where multiple fields are interlaced to produce a video frame, the interlacing of unrelated fields can result in a distorted output. For example, video frame $V_3$, which is a combination of video fields $e_3$ and $o_3$, is an interlacing of film frames $F_2$ and $F_3$. On a typical television monitor, the interlacing of disparate film frames is not usually a significant problem because the video fields, as opposed to the video frames, are "blitted" or displayed on the screen and because the relatively long persistence of phosphors used in television screens renders the interlacing of unrelated film frames relatively unnoticeable.

However, on a progressively scanned monitor, such as a computer monitor, the two video fields are typically combined to one frame and subsequently "blitted" or displayed frame by frame. The resulting video frames include video frames that are undesirably half from one film frame and half from a completely different frame, which creates a distorted video frame that is unlike a frame in the original film. In addition, where the film captures rapidly changing motion, the interlacing of two different film frames can result in a jagged appearance between the rows of interlaced fields.

It will be understood by one of ordinary skill in the art that the nomenclature used to describe frames in FIG. 3, e.g., video frames V1 to V5 in the first 3:2 pattern, can be represented in code implementing a system with numbers starting at zero.

Embodiments of the present invention can automatically perform an inverse telecine process and restore the frame rate and content of original frames originally taken at 24 fps. As described below, statistical methods are employed to advantageously perform the inverse telecine process and detect duplicate fields/frames, re-interlace fields as necessary, and re-sequence frames despite the presence of dropped video frames, video-editing, slow-motion sequences, compositing of different telecine sequences, compositing of telecine and original video material, and the like, without user intervention.

First, an inverse telecine process in accordance with an embodiment of the present invention will be described where the process converts a single field encoded frame. Later, an inverse telecine process in accordance with an embodiment of the present invention will be described where the process converts a multiple field encoded frame.

Figure 4:
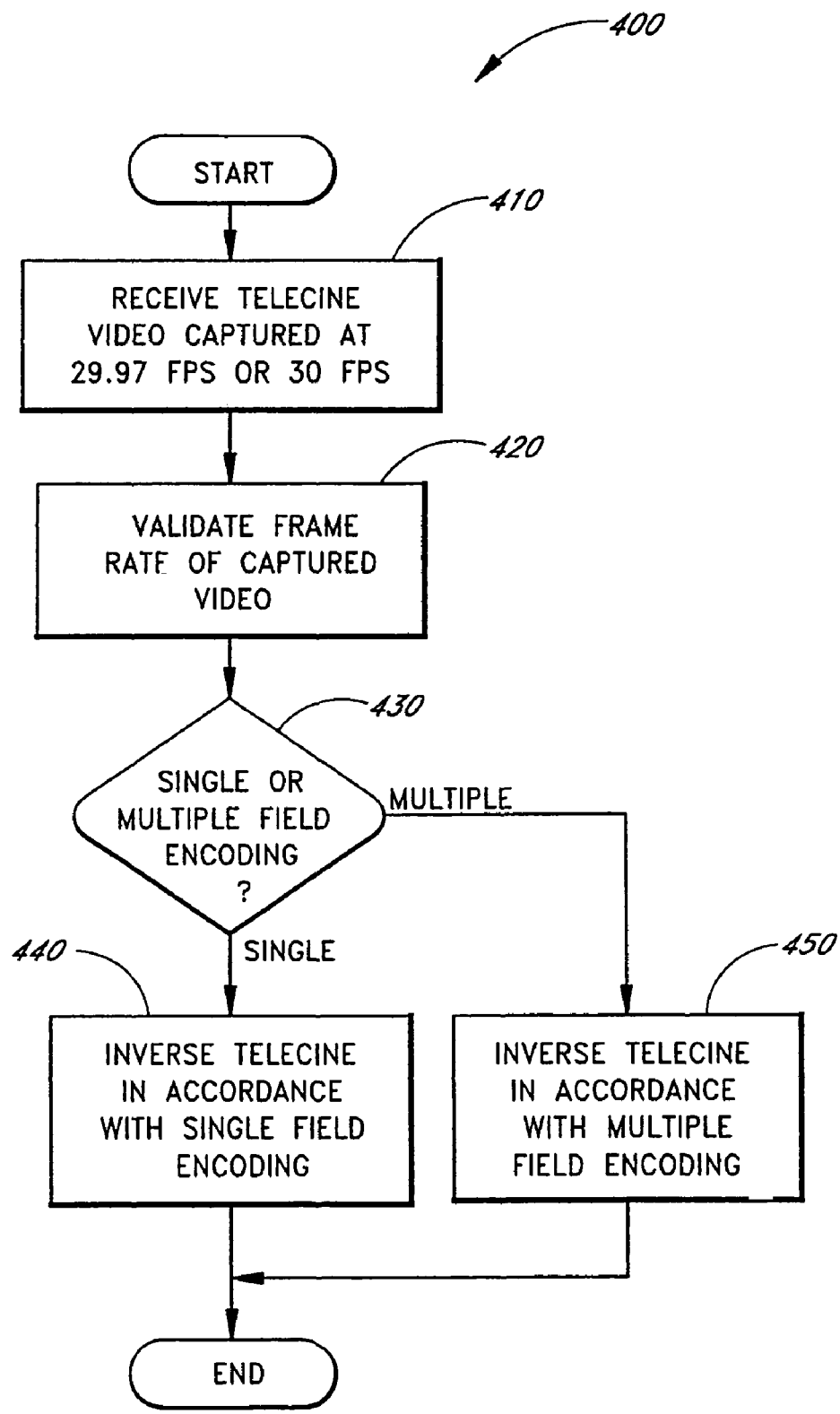
FIG. 4 illustrates an overview process according to an embodiment of the present invention.

FIG. 4 illustrates an overview of the inverse telecine process 400 according to an embodiment of the present invention. In State 410, the process 400 receives a video clip captured at 29.97 fps or 30 fps. The captured video can be streamed live, or can be retrieved from a storage device such as a disk drive. The process 400 advances from State 410 to State 420.

In State 420, the process 400 optionally validates that the frame rate of the video clip receives is within an expected range. The frame rate of the video clip can be detected by examining the time stamps associated with the frames and determining the interval between frames. Where the frame rate falls substantially below 29.97 fps or 30 fps, the video clip is probably not the product of a telecine process and thereby would likely not benefit from conversion by an inverse telecine process. In one embodiment, at State 420, the process rejects and discontinues processing of the video clip where the detected frame rate of the video clip is less than about 25.5 fps. The process 400 advances from State 420 to State 430.

In State 430, the process 400 detects whether the video frames are encoded by multiple fields or by single fields. The process 400 can initially distinguish between multiple fields and single fields and thereafter use the result, or can distinguish between multiple fields and single fields on an ongoing basis and adaptively switch between inverse telecine process techniques accordingly. Typically, a frame with more than 240 lines of resolution is encoded by multiple fields and a frame with 240 lines of resolution or less is encoded by a single field. In one embodiment, the process distinguishes between multiple field encoding and single field encoding by counting the lines present in a frame and where the number of lines is less than 242 lines, single field encoding is assumed, and where the number of lines is greater than or equal to 242 lines, multiple field encoding is assumed. Of course, the process can be configured to allow a user to select between single and multiple field encoding.

Where single field encoding is determined, the process 400 proceeds to State 440 and performs an inverse telecine process with single field encoding. An inverse telecine process for use with single field encoding is described in greater detail later in connection with FIGS. 5 to 11. Where multiple field encoding is determined, the process 400 proceeds to State 450, to perform an inverse telecine process for multiple field encoded frames, which is described in greater detail later in connection with FIGS. 12 to 17.

Figure 5:
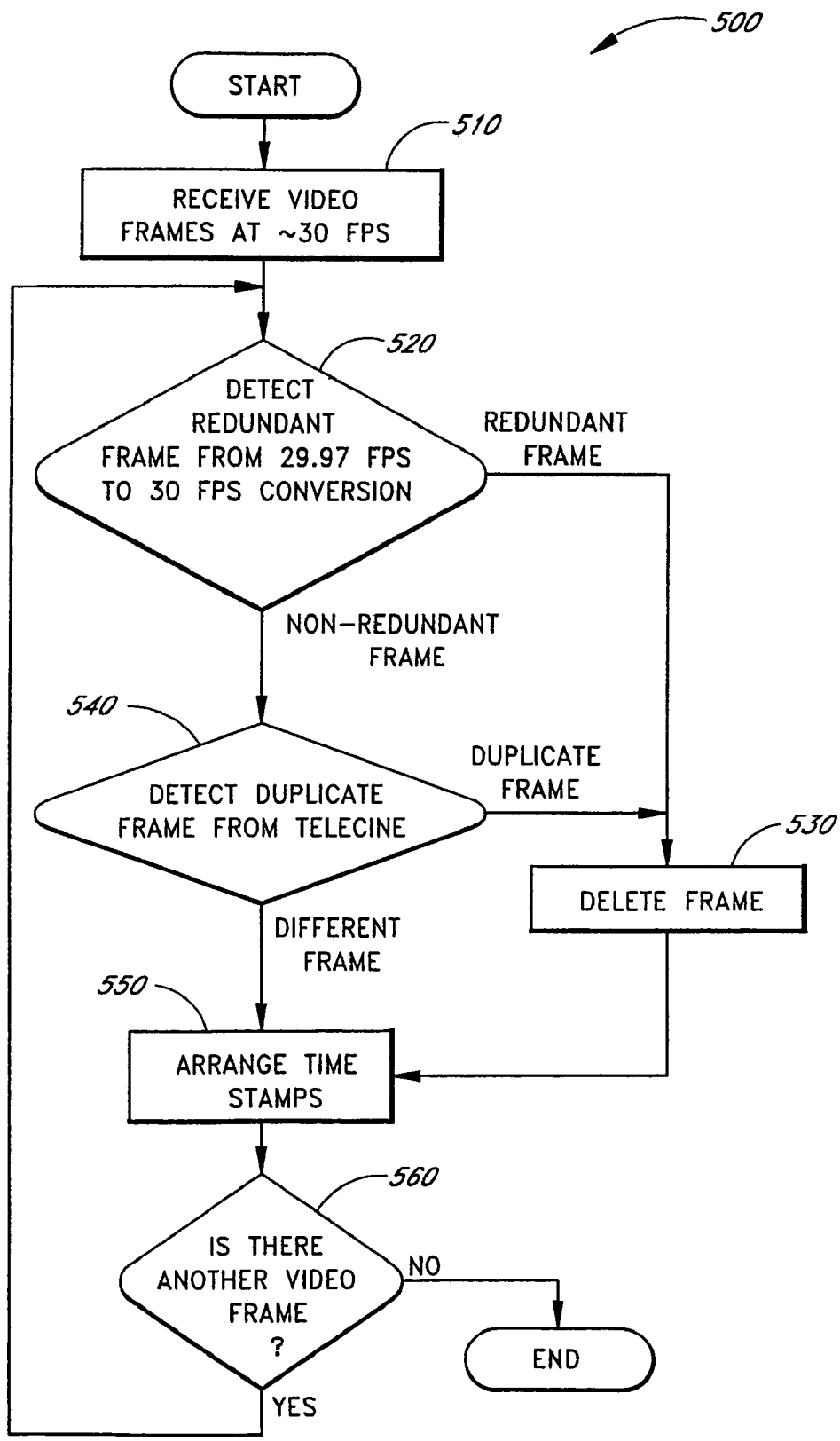
FIG. 5 illustrates an overview inverse telecine process in accordance with an embodiment of the present invention for converting non-interlaced frames.

FIG. 5 illustrates an inverse telecine process 500 in accordance with an embodiment of the present invention for converting non-interlaced frames. In State 510, the process 500 receives video frames at about a 30-fps rate; such as 29.97 fps or 30 fps, as described in connection with FIG. 3. It will be understood by one of ordinary skill in the art that the frame rate referred to herein can apply to a video clip in real time, or to a stored video clip that is formatted to playback at about a 30 fps rate. It will also be understood that the absence of frames due to dropped frames will lower the actual frame rate, and the frame rate referred to herein applies to the frame rate that one would expect without dropped frames. The process 500 advances from State 510 to State 520.

In State 520, the process 500 detects for redundant video frames that are the result of a conversion from a 29.97-fps video format to a 30-fps video format. As described in connection with FIG. 3, where 29.97-fps video has been converted to 30-fps video, one video frame is additionally copied approximately every 30 seconds. Under typical circumstances, the copy of the video frame is identical to the copied video frame.

In one embodiment, the redundant frame is detected by comparing the pixels of the present frame with the pixels of the previous frame. One embodiment compares selected pixels, such as every four pixels of the present and the previous frame, by computing a summation of the squares of the difference between the luminance (brightness) and chrominance (color) associated with the compared pixels of each frame. Another embodiment compares only the luminance component of the pixels selected for comparison. The formula expressed below embodies a summation of the squares of differences between pixels of adjacent frames.

$$\sum_{i=0}^{(N-1)/4} (a_{4i} - b_{4i})^2$$

The formula expressed above represents a summation taken over every fourth pixel of adjacent frames. N represents the number of pixels per frame, $a_{4i}$ represents a value associated with the 4i-th pixel of a first frame, and $b_{4i}$ represents a value associated with the 4i-th pixel of a frame adjacent to the first frame.

One embodiment further normalizes the comparison by dividing the summation of squares difference by the number of compared pixels. Therefore, the summation illustrated above is additionally divided by N/4. Of course, all the pixels of the frames can be compared, or fewer pixels than every fourth. Where both the luminance and the chrominance components of pixels are compared, the detected differences between the luminance and the chrominance components can be summed evenly or summed in a weighted manner. In one embodiment, the normalized summation of squares is further saturated, by, for example, limiting the normalized summation of squares to a predetermined value such as 100. In the illustrated example, where the normalized summation of squares computes to a value of 150, the saturation limits the value of the normalized summation of squares to a value of 100. Where video editing has been performed on the video sequence, the normalized summation of squares can result in a relatively large difference between two frames that can perturb later statistical analysis such as a calculation of a standard deviation. Saturation of the summation of squares allows the process to substantially tolerate pronounced differences between frames due to video edits and the like. In another embodiment, the normalized summation of squares is mapped to a nonlinear function, such as a logarithmic function, to provide a similar benefit.

Where a redundant frame exists, the summation equals zero and is detected accordingly. Therefore, one embodiment detects the presence of the redundant frame by measuring no difference between adjacent frames. It will be understood by one of ordinary skill in the art that to detect whether two frames are redundant or identical, neither a summation nor a squaring of the differences is necessary. However, redundant frames occur relatively infrequently (about once every 30 seconds) if at all, and the results of the summation are reused for later statistical analysis as will be described later in connection with FIG. 10. Optionally, the detection of an excess number of redundant frames can be prevented by, for example, providing the detection no more than once for every predetermined number of frames. In addition, the detection of a redundant frame can also be optionally inhibited when the frame rate falls below a predetermined threshold. One embodiment of the present invention further inhibits detection of redundant frames when the frame rate falls below 29.98 fps. It will be understood by one of ordinary skill in the art that the deletion of redundant video frames can be performed dynamically in conjunction with other inverse telecine process states, or can be performed independently on a video clip, which is then later processed by the other inverse telecine process states.

Additional details of State 520 are described later in connection with FIG. 6. Upon detection of a redundant frame, the inverse telecine process 500 proceeds from State 520 to State 530, where the redundant frame is deleted from the sequence.

In State 530, the redundant frame is removed from the sequence of frames and the timestamps of the remaining frames are adjusted accordingly by proceeding to State 550. In one embodiment, the timestamps of the remaining frames are adjusted after further removal of frames by the inverse telecine process 500.

Detection and deletion of the redundant frames that are a byproduct of conversion to 30 fps, brings the remaining sequence of frames closer to a more consistent 3:2 telecine pattern, thereby preparing the sequence of frames for processing in accordance with an automated inverse telecine.

In State 540, the inverse telecine process 500 receives frames sequenced at about 29.97 fps in the 3:2 telecine format. In State 540, the process 500 detects video frames that have captured the same film frame. As shown in FIG. 3, video fields $e_2$ and $e_3$, and video frames $V_2$ and $V_3$ (in a single field encoded system), both capture the same film frame, $F_2$. The duplicate video fields $V_2$ and $V_3$ are detected in State 540 and removed in State 530. Further details of States 540 and 530 are described later in connection with FIG. 7. The process advances from State 540 to State 550.

In State 550, the timestamps of the remaining frames are realigned so that the remaining frames are substantially evenly spaced over a 24 fps interval. For example, where the last frame is removed from a 5 frame sub-sequence, the timestamp for the first frame can remain unchanged, the timestamp for the second frame can be delayed by about 8 milliseconds (mS), the timestamp for the third frame can be delayed by about 17 mS, and the timestamp for the fourth frame can be delayed by about 25 mS. The process advances from State 550 to State 560. In State 560, the process determines whether there are additional video frames to process and returns to State 520 to continue the inverse telecine process.

It will be understood by one of ordinary skill in the art that the detection, deletion, and resequencing of redundant frames as shown in FIG. 5 can be performed in real time, as a video stream is received by a server, or can be performed on stored data in a batch process.

Figure 6:
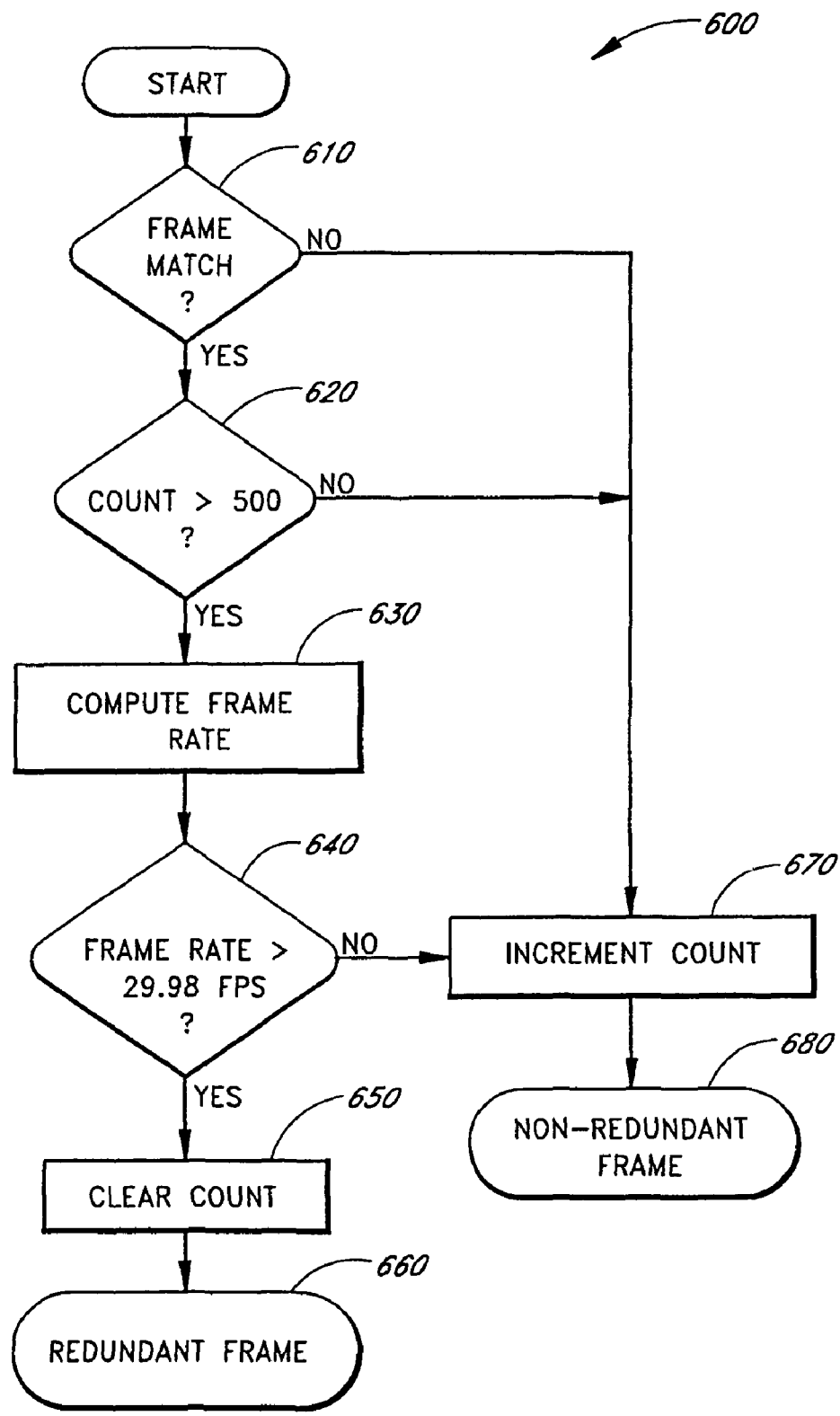
FIG. 6 illustrates a process of removing redundant frames from a video sequence or clip.

FIG. 6 illustrates a process 600 according to one embodiment of the present invention that can implement State 520. In State 610, the process 600 compares a frame to its preceding frame, by, for example, computation of a summation of squares of the differences between the frames. The process proceeds to State 620 when the frames match, as indicated by a zero summation, or the process proceeds from State 610 to State 670 when the frames do not match.

In State 620, the process 600 compares a count of a subset of the number of frames that have passed to a predetermined number, shown here as 500. It will be understood by one of ordinary skill in the art that the predetermined number can conform to a wide range of numbers, such as a range between 500 and 900 frames. The count tracks a number of the frames processed since the detection of the prior redundant frame. The count is cleared, as shown in State 650, when the redundant frame is removed. Where the detection of the prior redundant frame occurs closer in than the predetermined number frames, the process 600 proceeds to State 670 and does not indicate a redundant frame. This reduces the risk of the undesirable removal of frames where there is intentionally very little difference between frames. Where the detection of the prior redundant frame occurs farther out than the predetermined number of frames, the process 600 proceeds from State 620 to State 630.

In State 630, the process 600 computes the frame rate of the processed sequence of frames. As redundant video frames are detected and removed, the frame rate of the remaining frames decreases. For example, the frame rate can start at 30 fps, then conform to 29.97 fps after removal of redundant frames, and then can conform to a 24 fps frame rate after completion of the inverse telecine process. In State 630, the process dynamically computes the frame rate of the video clip after removal of any detected redundant frames but prior to removal of additional frames by the remainder of the inverse telecine process. The process 600 advances from State 630 to State 640.

In State 640, the process 600 computes whether the frame rate computed in State 630 is greater than a predetermined frame rate. In one embodiment, the process proceeds from State 640 to State 650 when the computed frame rate exceeds about 29.98 fps, and the process proceeds from State 640 to State 670 when the computed frame rate is lower than about 29.98 fps. By maintaining a frame rate after removal of redundant frames of at least 29.97 fps, the original speed of the video clip and the 3:2 sequence of the telecine process are more likely to be preserved.

In State 650, the process 600 clears the count. The count is cleared to allow the tracking of the number of frames that have passed since the previously detected redundant frame. The process 600 then advances to State 660 with a detection of the redundant frame and proceeds from State 660 to State 540 of the inverse telecine process 500.

In State 670, the process 600 increments the count to track the number of frames that have passed. Of course, rather than count up, the count can be configured to count down from the predetermined number, e.g., count down from 500, and State 620 can be reconfigured accordingly. The process 600 advances to from State 670 to State 680 and indicates that there is no redundant frame. The process then advances from State 680 to State 530 of the inverse telecine process 500.

Figure 7:
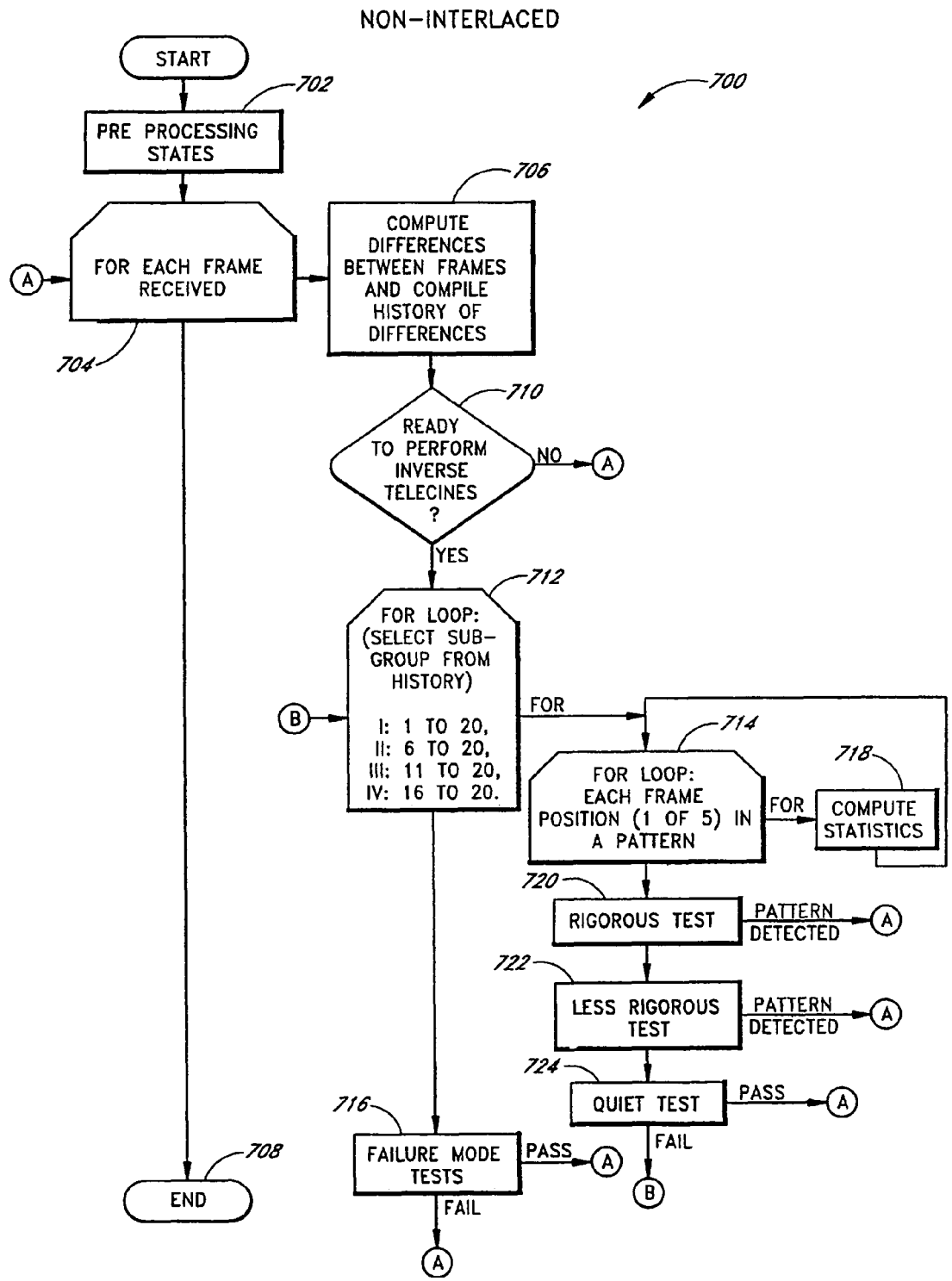
FIG. 7 illustrates an inverse telecine process in accordance with an embodiment of the present invention for converting non-interlaced frames.

FIG. 7 illustrates an inverse telecine process 700 according to one embodiment of the invention that applies to non-interlaced frames. In State 702, the inverse telecine process 700 performs pre-processing steps. The pre-processing states include initialization states, verification states such as a verification that the received frame rate is at least 25.5 fps, detection of single field or multiple field encoding of frames as described in State 430 of FIG. 4, and the like. The process 700 advances from State 702 to State 704.

In State 704, the process 700 initiates a loop, such as a "for" loop or a "while" loop, to receive and analyze video frames. When a new frame is retrieved, the process advances to State 706. When the frames have been processed or the desired frames of the sequence have been processed, the process advances to State 708 and has completed processing of the video sequence.

Figure 8:
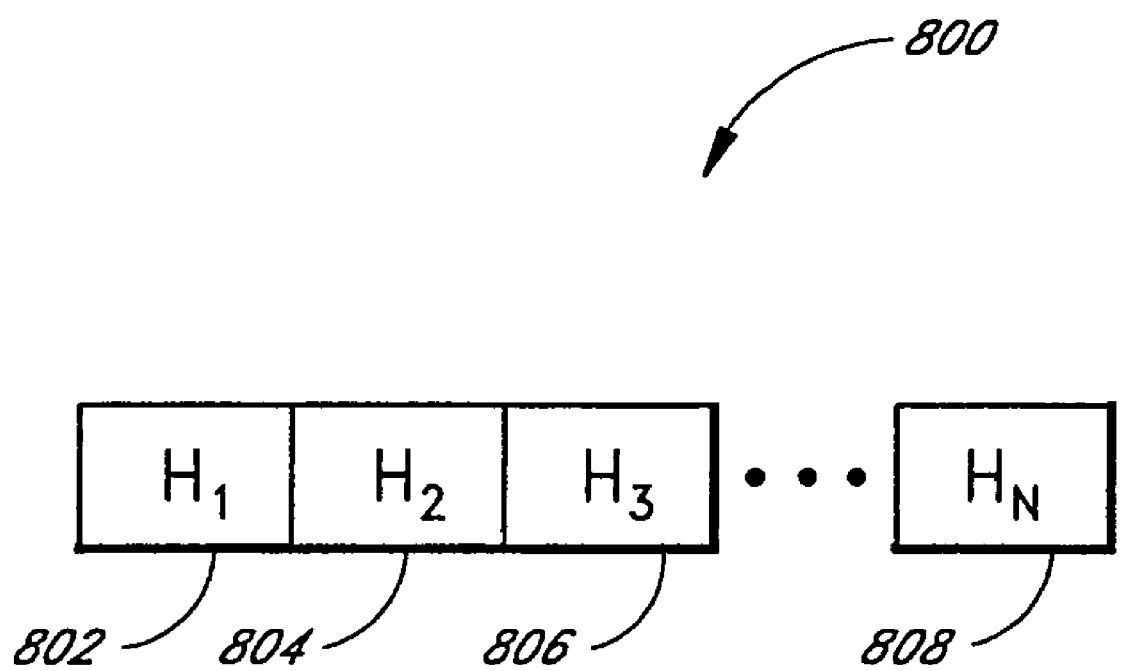
FIG. 8 illustrates a collection that can maintain a history of differences or comparisons between frames.

In State 706, the process compares the present frame received with the previous frame received, and the process compiles a history of the comparisons between frames in a collection. In one example, the collection holds a history of the last 20 comparisons. Such comparisons can be computed by the normalized and saturated summation of squares technique described in connection with State 520 of FIG. 5. FIG. 8 illustrates a graphical representation of one embodiment of a collection 800, which can maintain a history of the last N comparisons. Where a dropped frame is detected, a value representing an unknown is entered into the collection as the difference for the dropped frame. Where multiple dropped frames are detected, multiple unknowns are entered into the collection. In addition, the unknowns corresponding to dropped frames are placed in the collection according to a predicted arrival for the frame that was dropped. In one embodiment, a second collection maintains a status of the presence of dropped frames corresponding to the history collected in the first collection.

One embodiment of the present invention further maintains a removal pattern variable useful for predicting synchronization with a telecine pattern based on past detections of the telecine pattern. When data is added to the collection, either through computed comparisons or unknowns, the variable can be incrementally rotated through the five possible 3:2 telecine positions so that the detection of future telecine patterns can depend on the past detections.

The illustrated collection holds the oldest difference in $H_1$, the second oldest difference in $H_2$, the third oldest difference in $H_3$, and the latest difference in $H_N$. In one embodiment, the collection is configured such that N conforms to a multiple of 5, such as 20, and the collection maintains a history of the latest 20 comparisons.

In one embodiment, as the process continues to compare frames, the values in the illustrated collection are shifted to the left and the new comparison is entered into $H_N$, such that the collection maintains the latest N comparisons. It will be understood by one of ordinary skill in the art that the collection can be implemented in a large memory such as a Random Access Memory (RAM), where only a relatively small portion of the RAM maintains the collection. It will further be understood by one of ordinary skill in the art that rather than shift data across the collection to maintain the latest N comparisons in an orderly manner, one embodiment according to the present invention can update one component in the collection and resolve which component to with reference to a pointer that loops according to modulo N arithmetic.

Further details of State 706 are described later in connection with FIG. 9. The process advances from State 706 to State 710. In State 710, the process optionally determines whether the process has collected a meaningful sample of data with which to perform the analysis for the inverse telecine process. In one embodiment, State 710 determines whether the process is ready to proceed with the inverse telecine process by determining that the collection has been filled with historical comparisons, and by determining that the frame rate is at least 25 fps. Where State 710 determines that the process is not ready for inverse telecine analysis, the process returns to State 704 to retrieve another frame. Otherwise, the process advances to State 712.

In State 712, the process 700 advantageously initiates a loop to select a sub-group from the history. When State 712 selects an iteration of the loop, the process proceeds to State 714. When State 712 has completed looping, the process proceeds to State 720.

In one embodiment, where the collection maintains a history of the most recent 20 comparisons between frames, a first iteration through the loop analyzes the most recent 20 comparisons between frames ($H_{20}$ through $H_1$), a second iteration through the loop analyzes the most recent 15 comparisons between frames ($H_{20}$ through $H_6$), a third iteration through the loop analyzes the most recent 10 comparisons between frames ($H_{20}$ through $H_{11}$), and a final iteration through the loop analyzes the most recent 5 comparisons between the frames ($H_{20}$ through $H_{16}$).

By varying how far back in history to search for patterns, one embodiment according to an embodiment of the present invention can advantageously adaptively detect telecine patterns. Adaptively conforming the inverse telecine process to the history of the comparisons allows an embodiment according to the present invention to advantageously detect telecine patterns where differences between frames are minute, and yet, to advantageously avoid detection of a false telecine pattern where no telecine pattern exists. This allows an embodiment of the present invention to automatically perform an inverse telecine process with relatively little if any user intervention.

For example, where a telecine pattern has asserted itself in a relatively large sequence, such as over 20 frames, a threshold for detection of a duplicated frame can be relatively low so that the inverse telecine process can detect duplicate frames in slow motion sequences, scenes with little movement, and the like. Further, by dynamically varying a history sample size and raising the threshold for detection for a shorter history as opposed to a longer history, a telecine pattern can be detected even where the picture is rapidly changing, such as often encountered in edits and special effects sequences.

In State 714, the process initiates a further sub-loop. A video frame in a 3:2 telecine pattern conforms to one of five frame positions within the 3:2 telecine pattern to which a frame can belong. One of the 5 frame positions corresponds to the duplicate frame, which is detected and removed by the inverse telecine process. Each iteration through the loop starting at State 714 thus initiates a statistical analysis to search for the 3:2 telecine pattern at each variation or frame position of the 3:2 telecine pattern. Such statistical analysis can include computation of a mean, median, variability, standard deviation, and the like. The comparisons computed in State 706 can include absolute values of differences, summations of squares of differences, etc. One embodiment advantageously normalizes the differences with respect to the number of pixels compared. In one embodiment, the statistical analysis is performed on a summation of squares of differences, where each square of differences is further normalized and saturated to a maximum value such as 100. In one embodiment, the process divides the historical differences analyzed into at least two groups for each iteration through the loop.

The two groups are referenced herein as an "in-group" and an "out-group." The "in-group" comprises the differences between frames that correspond to the frame position selected in the iteration of the loop. The "out-group" corresponds to differences of the remaining frames. Using the references for histories as shown in FIG. 8 as an example, where State 712 selects a 20 frame history and the frame position selected in State 714 corresponds to the latest history compiled, the members of the "in-group" comprise $H_{20}$, $H_{15}$, $H_{10}$, and $H_5$. By contrast, the members of the "out-group" comprise $H_{19}$, $H_{18}$, $H_{17}$, $H_{16}$, $H_{14}$, $H_{13}$, $H_{12}$, $H_{11}$, $H_9$, $H_8$, $H_7$, $H_6$, $H_4$, $H_3$, $H_2$, and $H_1$. In one embodiment, the process computes the mean and the standard deviations of the "in-group" and the "out-group." Further details of one embodiment of the computation of statistics shown by State 718 are described later in connection with FIG. 10.

In another embodiment, the process divides the historical differences into multiple groups, such as five groups. The historical differences can be arranged such that each of the five groups contains entries from the historical differences that are 5 frames apart.

In State 720, the process searches through the collected statistical analysis with a relatively rigorous test to detect the 3:2 telecine patterns. In one embodiment of State 720, the process compares a first quantity based on the "in-group" mean, a first variable based on the size of the sub-group selected in State 712, and the standard deviation of the "in-group" data, with a second quantity dependent on the "out-group" mean, a second variable based on the size of the sub-group selected in State 712, and the standard deviation of the "out-group" data. The formula expressed below embodies one such comparison:

$$\bar{g}_i + w_i(p) \cdot s_{g_i} < \bar{g}_o - w_o(p) \cdot s_{g_o}$$

In the formula expressed above, $\bar{g}_i$ represents a mean or average of the members belonging to the "in-group," $w_i(p)$ represents a variable or weighing factor based on the size of the sub-group selected in State 712, $s_{g_i}$ represents the standard deviation of the members belonging to the "in-group," $\bar{g}_o$ represents a mean of the members belonging to the "out-group," $w_o(p)$ represents a variable or weighing factor based on the size of the sub-group selected in State 712, and $s_{g_o}$ represents the standard deviation of the members belonging to the "out-group." The variable $w_i(p)$ can be implemented by a lookup table wherein $w_i(p)$ conforms to a value of 3 when the sub-group size is 15 or 20 frames, and a value of 4 when the sub-group size is 5 or 10 frames. Similarly, the variable $w_o(p)$ can be implemented by a lookup table wherein $w_o(p)$ conforms to a value of 1 when the sub-group size is 15 or 20 frames, and a value of 2 when the sub-group size is 5 or 10 frames.

In one embodiment, successful detection of the telecine pattern in State 720 further resets the removal pattern variable to correspond to the detected telecine pattern. Additionally, when the telecine pattern matches the frame position of the present frame, the present frame is deleted, the process returns to State 704 to retrieve the next frame, and the timestamps of the remaining frames are spread according to 24 fps periods. In one embodiment, the process further examines a timer that compares the timestamp associated with the present frame with the timestamp of the previous frame deleted. Where the timestamps approximately correspond to a 5 frames at 33.4 mS per frame period or about 167 mS, the process updates a counter to indicate that the duplicate telecine frames are removed consistently. In one embodiment, the about 167 mS period falls within a range of approximately 145 mS to approximately 175 mS.

When the detected telecine pattern in State 720 fails to match the frame position of the present frame, the frame is not deleted and the process returns to State 704 to process the next frame. Further details of one embodiment of State 720 are described later in connection with FIG. 11.

In State 722, the process searches through the collected statistical analysis with a relatively less rigorous test to detect one of the 5 possible 3:2 telecine patterns. In one embodiment, State 722 is implemented by substantially the same loop as described in connection with State 720, but with a different comparison used to detect the telecine pattern. In one embodiment of State 722, the process compares a first quantity dependent on the "in-group" mean, the first variable based on the size of the sub-group selected in State 712, and the standard deviation of the "in-group" data, with a second quantity dependent on a minimum value of data from the "out-group." The formula expressed below embodies one such comparison:

$$\bar{g}_i + w_i(p) \cdot s_{g_i} < n_o$$

In the formula expressed above, $\bar{g}_i$ represents a mean or average of the members belonging to the "in-group," $w_i(p)$ represents a variable or weighing factor based on the size of the sub-group selected in State 712, $s_{g_i}$ represents the standard deviation of the members belonging to the "in-group," and $n_o$ represents the minimum value of a member in the "out-group" (notwithstanding values inserted as unknowns). The variable $w_i(p)$ can be implemented by a lookup table wherein $w_i(p)$ conforms to a value of 3 when the sub-group size is 15 or 20 frames, and a value of 4 when the sub-group size is 5 or 10 frames.

If the relationship expressed in the formula above is true, the process proceeds to analyze whether prior frames had been removed consistently as described in connection with State 720. If the relationship expressed in the formula above is false, the process proceeds to State 724. Where prior frames had not been removed consistently, the process proceeds also proceeds to State 724. Where the relationship is true and the prior frames had been consistently removed, the process proceeds to determine whether the present frame position matches with the detected telecine pattern. Where the present frame position matches with the detected telecine pattern for a duplicate frame, the present frame is removed, the timestamps of the remaining frames spread according to a 24 fps rate, and the timer is examined to update the counter with a status of whether the presently removed frame was removed consistent with the 3:2 timing of the previously removed frame (about 167 mS ago).

Where the present frame does not correspond with the duplicate frame position of the detected telecine pattern in State 722, the process returns to State 704 to retrieve the next frame.

At State 724, a telecine pattern has not been observed in States 720 and 722 for the sub-group size selected in State 712. A telecine pattern can be difficult to observe where, for example, the frames are relatively static, i.e., do not differ significantly. Where a series of frames exhibit relatively small differences, the condition is termed "quiet." In State 724, the process removes a frame consistent with the previously observed telecine patterns to maintain the inverse telecine process. In one embodiment of State 724, the process removes a frame upon an analysis of the frames for "quietness," analysis of the history for consistency of past removal of frames, and analyzes the collected history to determine whether the history collected comprises a statistically meaningful sample size.

In one embodiment of State 724, to delete the present frame, the maximum difference for a member in the "in-group" corresponding to the present frame is less than 9 (as computed by the normalized summation of squares), the maximum difference for a member in the "out-group" corresponding to the present frame is also less than 9, the "in-group" comprises at least 2 actual computed differences, and the "out-group" comprises at least 5 actual computed differences. Where the conditions referenced above are true, the process deletes the present frame from the sequence, aligns the timestamps of the remaining frames according to the 24 fps film rate, and returns to State 704 to continue processing. Where one of the conditions referenced above is false, the process returns to State 712 to continue the detection with a smaller group size.

After State 712 has reached the smallest group size, which is 5 frames in the illustrated embodiment, State 712 advances to State 716. In one embodiment of State 716, the process deletes the present frame and realigns the timestamps of the remaining frames when the following conditions, below, are true.

A first condition of State 716 is that the present frame and the prior frame were actual frames (as opposed to dropped frames) with a difference of less than 9 (as computed by the normalized summation of squares), or, that the difference between the last two frames is less than the prior difference between the previous two frames (the third to last and the second to last frames). A second condition of State 716 is that the telecine pattern had been detected by either State 720 or State 722 in the past. A third condition is that the "in-group" corresponding to the present frame contain at least 2 members and that the "out-group" corresponding to the present frame contain at least 5 members. A fourth condition is that the previously removed frame was removed 5 frames ago, consistent with the 3:2 telecine pattern. Where the four conditions above are true, the process deletes the present frame, realigns the timestamps of the remaining frames, and returns to State 704 to retrieve the next frame. Where a condition from the four conditions is not true, the process returns to State 704 to retrieve the next frame without deleting the present frame.

The process continues looping in the manner described until the frames of the sequence have been retrieved and processed. When no frames are left for processing, the process proceeds from State 704 to State 708 and ends.

Figure 9:
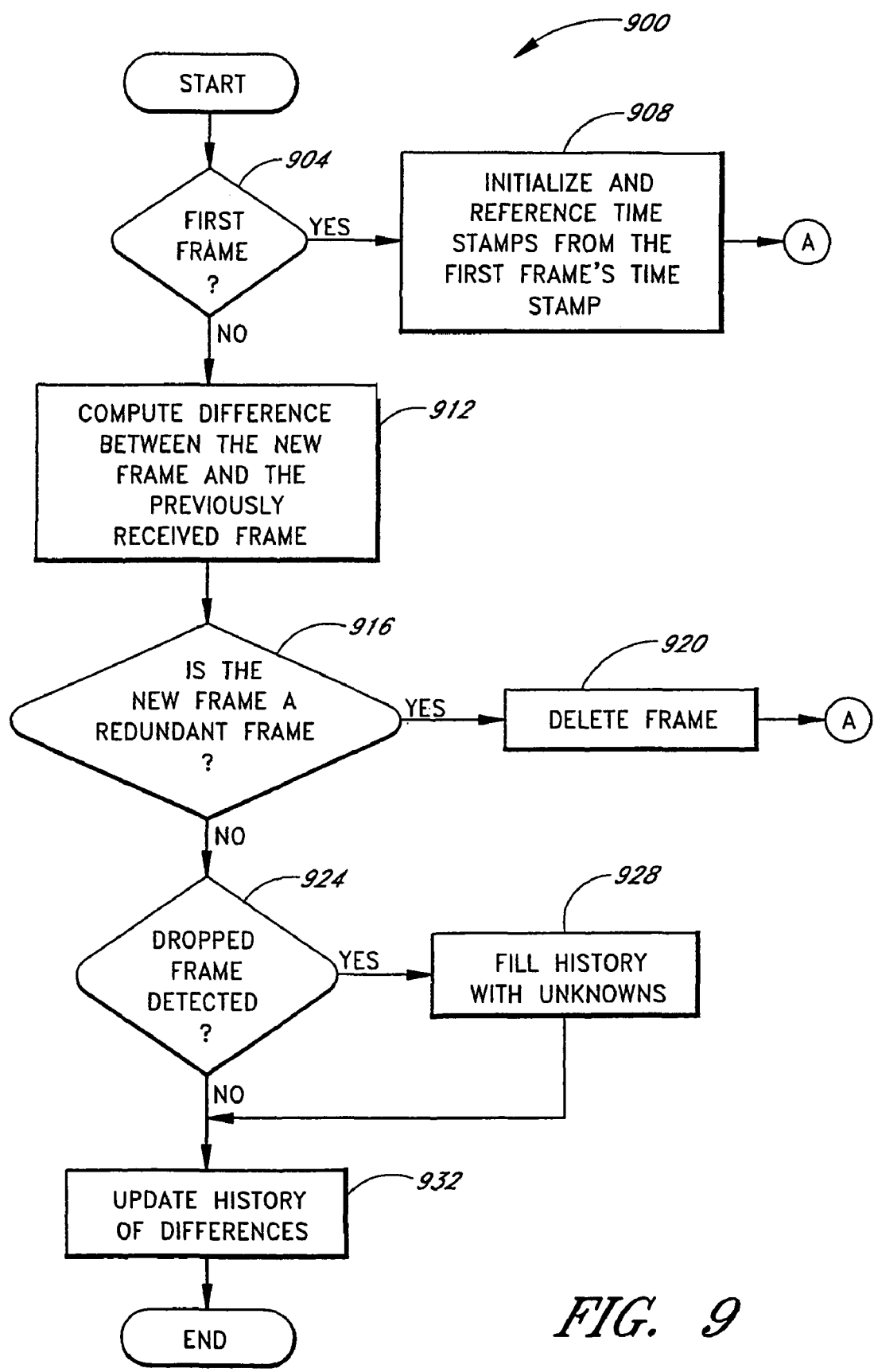
FIG. 9 illustrates one process according to an embodiment of the present invention of computing and compiling differences in frames.

FIG. 9 illustrates a process 900 that provides further details of one embodiment of State 706 of the process described in connection with FIG. 7.

In State 904, the process receives a frame (the "present" frame) and determines whether the present frame is the first frame in the sequence. Where the present frame is the first frame, the process proceeds from State 904 to State 908. Where the present frame is not the first frame, the process proceeds from State 904 to State 912.

In State 908, the process performs initialization steps, such as the entering of default values and the like. In addition, the timestamp associated with the first frame can be used to compute the relative timing of future frames. The process returns from State 908 to State 704 to retrieve the next frame.

In State 912, the process computes the difference between the present frame and the previous frame. One embodiment of State 712 computes the difference between the frames in accordance with the normalized and saturated summation of squares technique described in connection with State 520 of FIG. 5.

The process advances from State 912 to State 916. In State 916, the process determines whether the present frame is a redundant frame that is an artifact of a prior 29.97 fps to 30 fps conversion. In one embodiment, the detection of the redundant frame occurs when the present frame and the previous frame are identical. In another embodiment, the detection of the redundant frame occurs when the difference between the present frame and the previous frame is relatively low.

Where a redundant frame is detected, the process proceeds from State 916 to State 920, where the redundant frame is deleted. The process then returns to State 704 to retrieve another frame. Where a redundant frame is not detected, the process proceeds from State 916 to State 924.

In State 924, the process determines whether there were any dropped frames between the present frame and the previous frame. For example, temporary interruptions to network connections, high network traffic loads, and the like can cause sporadic receipt of frames. One embodiment of State 924 detects the occurrence of a dropped frame by measuring the difference in time between the present frame and the previous frame. The difference in time between the frames can be computed by subtracting the timestamp associated with the previous frame from the timestamp associated with the present frame.

Without the occurrence of dropped frames, the time interval between frames of 29.97 fps rate typically conforms to about 33.4 mS. In one embodiment, a dropped frame is detected when the time interval between frames is greater than about 50 mS. It will be understood by one of ordinary skill in the art that the threshold used to detect a dropped frame can conform to a relatively wide range, but should be greater than 33.4 mS and less than 66.7 mS. For example, in another embodiment, the threshold corresponds to a time period within a 45 mS to 55 mS range.

When a dropped frame is detected, the process proceeds from State 924 to State 928, where an entry in the collection that would have corresponded to the dropped frame is updated with an unknown. In one embodiment, the entries in the collection of the history of differences between frames are spaced according to the 29.97 fps frame rate. In the illustrated embodiment for a collection shown in FIG. 8, as each new history is entered to the collection, the prior entries are shifted to positions in the collection to indicate relative timing to the present frame. In one embodiment, an unknown is represented in the collection by storing a negative 2 in the corresponding entry of the collection. Of course, an additional related collection can also store an indication for a dropped frame.

In addition, the 33.4 mS period is subtracted from the time interval between frames so that multiple dropped frames can be detected by returning from State 928 to State 924 until the remaining time interval falls below 50 mS.

Where no dropped frame is detected or where the time interval has fallen below 50 mS, the process proceeds from State 924 to State 932. In State 932, the process updates the collected history of differences between frames with the difference between the present frame and the previous frame. In one embodiment, the previous entries in the collection are shifted with the addition of the new comparison data, to maintain the timing of the differences relative to the present frame. The process advances from State 932 to State 710 of FIG. 7.

Figure 10:
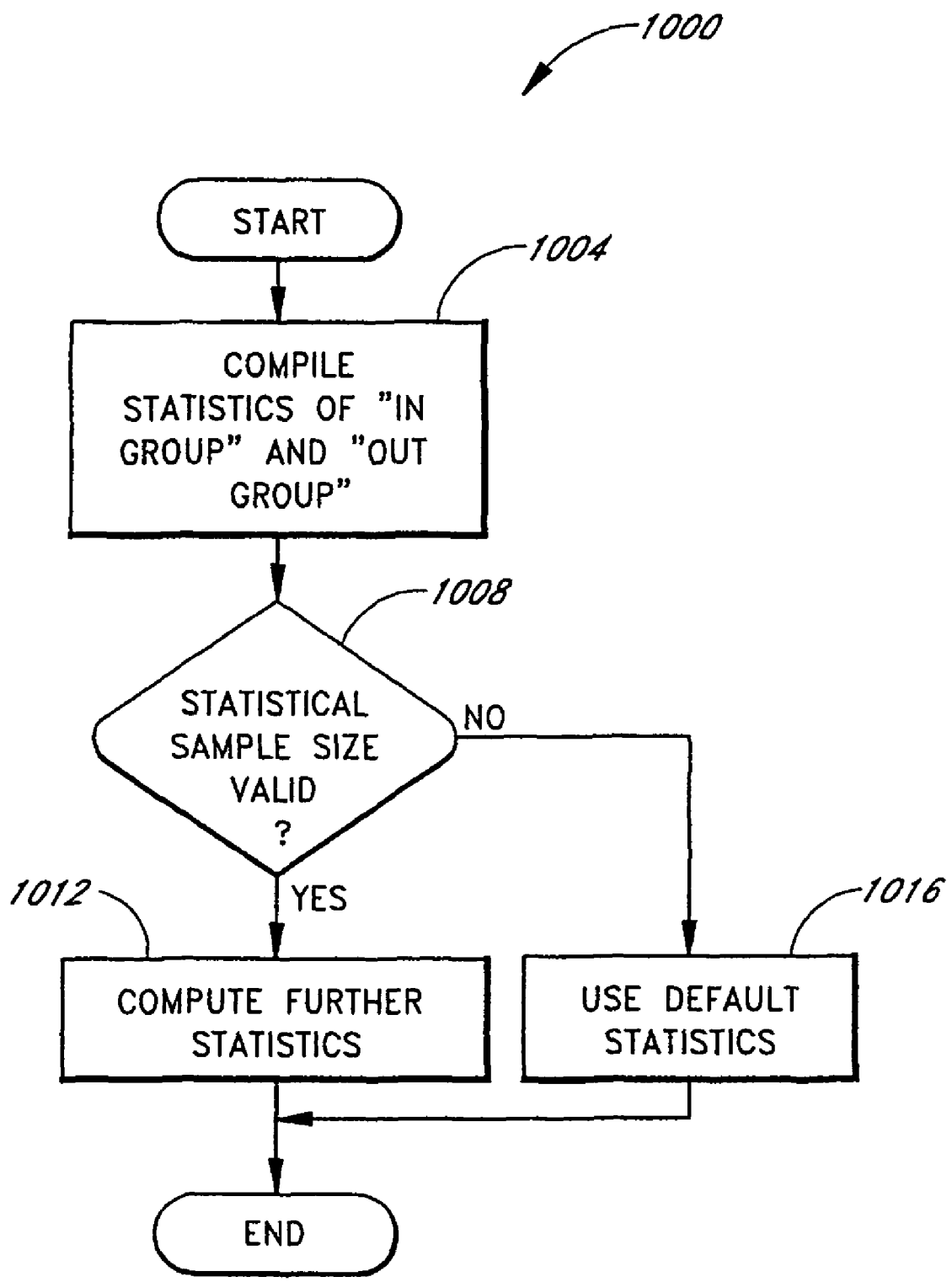
FIG. 10 illustrates a process for performing statistical analysis of differences between frames.

FIG. 10 illustrates a process 1000, which provides further details of one embodiment of State 718 of the process described in connection with FIG. 7.

In State 1004, the process compiles statistics of the collected differences between frames. In one embodiment, State 714 provides an indication of a pattern, and the process compiles an "in-group" and an "out-group" set of statistics as described in connection with State 714. In one embodiment, values in the collection corresponding to unknowns due to dropped frames are ignored in the statistical computation. In one embodiment, the computations performed in State 1004 include a summation of the actual (non-unknown) comparisons in the "in-group" and the "out-group," as well as a count of the comparisons in the "in-group" and in the "out-group."

The process advances from State 1004 to State 1008. In State 1008, the process determines whether a statistically significant number of samples were included in the compilation of statistics. The number of samples included in the compilation of statistics depends on the sub-group size specified in State 712 and on the pattern selected in State 714, which determines which differences in the collection belong to the "in-group" and which differences in the collection belong to the "out-group."

In one embodiment, the process proceeds from State 1008 to State 1012 when there are at least 2 samples analyzed in the "in-group" and at least 5 samples analyzed in the "out-group." Otherwise, the process proceeds from State 1008 to State 1016.

In State 1012, the process performs further statistical analysis of the comparisons in the "in-group" and in the "out-group." Examples of the further statistical analysis performed include computation of means, variances, and standard deviations of the comparisons in the "in-group" and the "out-group." The process returns from State 1012 to State 714 for further processing of the next frame pattern.

In State 1016, the process substitutes predetermined values for the statistics and can set a flag to indicate that the number of samples in either the "in-group" or the "out-group" was is low to analyze meaningfully. The process returns from State 1016 to State 714 for further processing of the next frame position.

Figure 11:
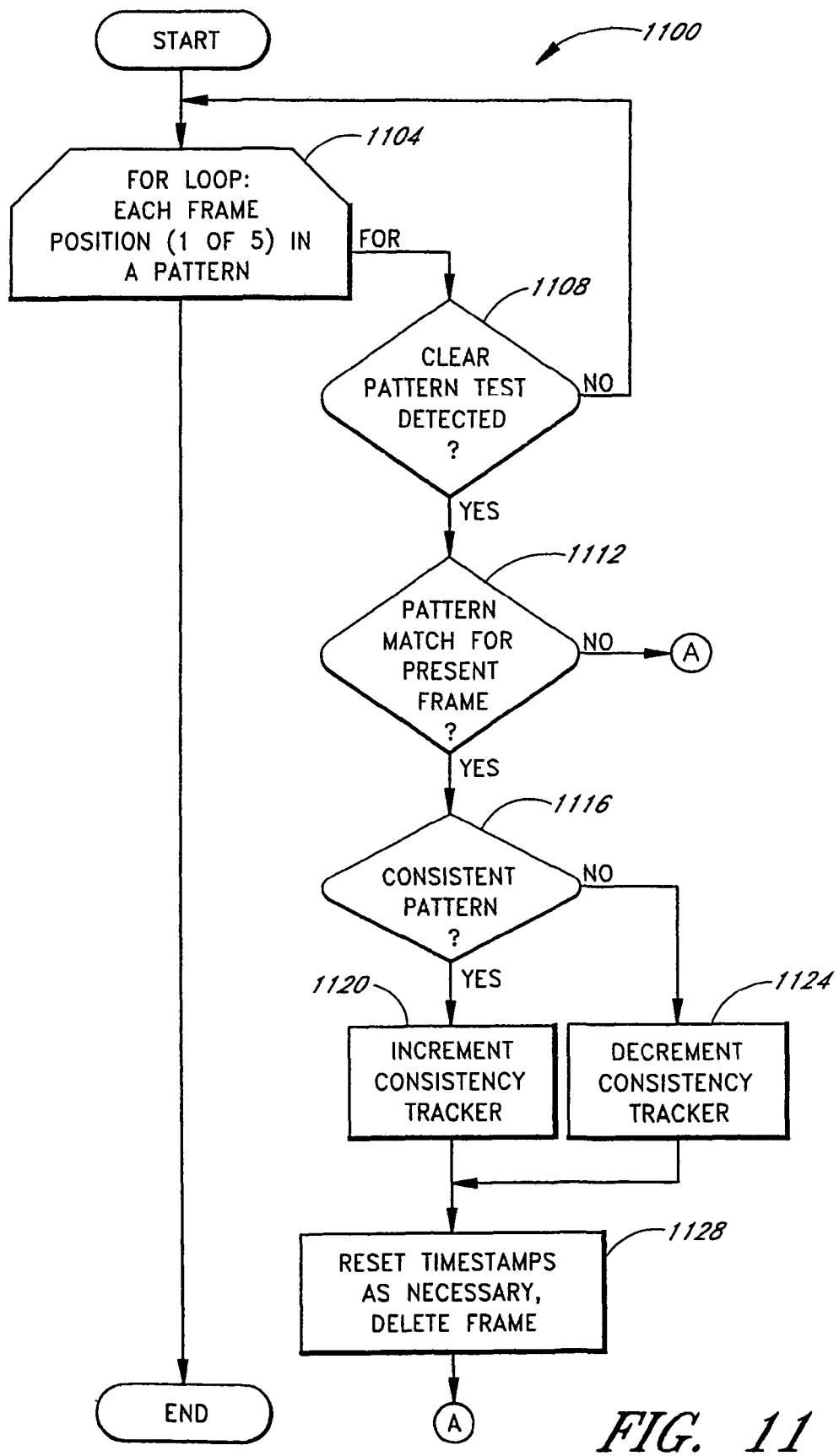
FIG. 11 illustrates one process according to an embodiment of the present invention of detecting a relatively clear telecine pattern.

FIG. 11 illustrates a process 1100 that provides further details of one embodiment of State 720 of the process described in connection with FIG. 7.

In State 1104, the process initiates a loop to test for a telecine pattern in one of the 5 possible 3:2 patterns in the collection. The process proceeds to State 1108 when there is still at least one pattern to test and a telecine pattern has not yet been detected by the process. The process proceeds to State 722 if the 5 possible patterns have been tested and no telecine pattern was detected by the process 1100.

In State 1108, the process determines whether there is statistically sufficient collection of data in the "in-group" and the "out-group." If, for example, a relatively large number of dropped frames results in less than 2 members in the "in-group" or less than 5 members in the "out-group," the process returns to State 1104 to test the next frame position. Where a statistically sufficient collection of data resides in the "in-group" and the "out-group," one embodiment of the process detects a pattern based on the comparison described in connection with State 714:

$$\bar{g}_i + w_i(p) \cdot s_{g_i} < \bar{g}_o - w_o(p) \cdot s_{g_o}$$

Advantageously, the comparison varies with the group size selected in State 712 to raise the threshold for detection of a telecine pattern as the size of the group decreases. By raising the threshold for detection for fewer frames, the process is less prone to false detection. If a telecine pattern is observed in State 1108, the process proceeds from State 1108 to State 1112. If a telecine pattern is not observed in State 1112, the process returns to State 1104 to test another frame pattern.

In State 1112, the process tests whether the telecine pattern observed in the portion of the collection selected by State 712 corresponds to the present frame, i.e., is a frame that duplicated the same film frame. If the present frame corresponds to the detected telecine pattern, the process advances to State 1116. If the present frame fails to correspond to the detected telecine pattern, the process returns to State 704 to retrieve the next frame and does not delete the present frame.

In State 1116, the process compares the timestamp of the previously removed frame to determine whether the inverse telecine process is identifying the extra frame of telecine pattern consistently, i.e., about 5 frames apart. In one embodiment, where the frame identified for is consistent with the previously removed frame, the process proceeds to State 1120, where a counter is incremented to measure the consistency of removal of frames. The process advances from State 1120 to State 1128. Where the frame identified for removal fails to follow is not consistent with the previously removed frame, the proceeds to State 1124, where the counter is decremented. The process advances from State 1124 to State 1128. In State 1128, the process removes the present frame, and realigns the timestamps of the remaining frames in accordance with the 24-fps film frame timeline. The process returns from State 1128 to State 704 to retrieve the next video frame.

Now, an inverse telecine process in accordance with an embodiment of the present invention will be described where the process converts a multiple-field encoded frame. The process reduces the number of frames, thereby advantageously reducing the bandwidth used to transmit the video clip, and yet, the process advantageously improves the quality of the processed video clip by re-interlacing video frames that combined disparate film frames.

Figure 12:
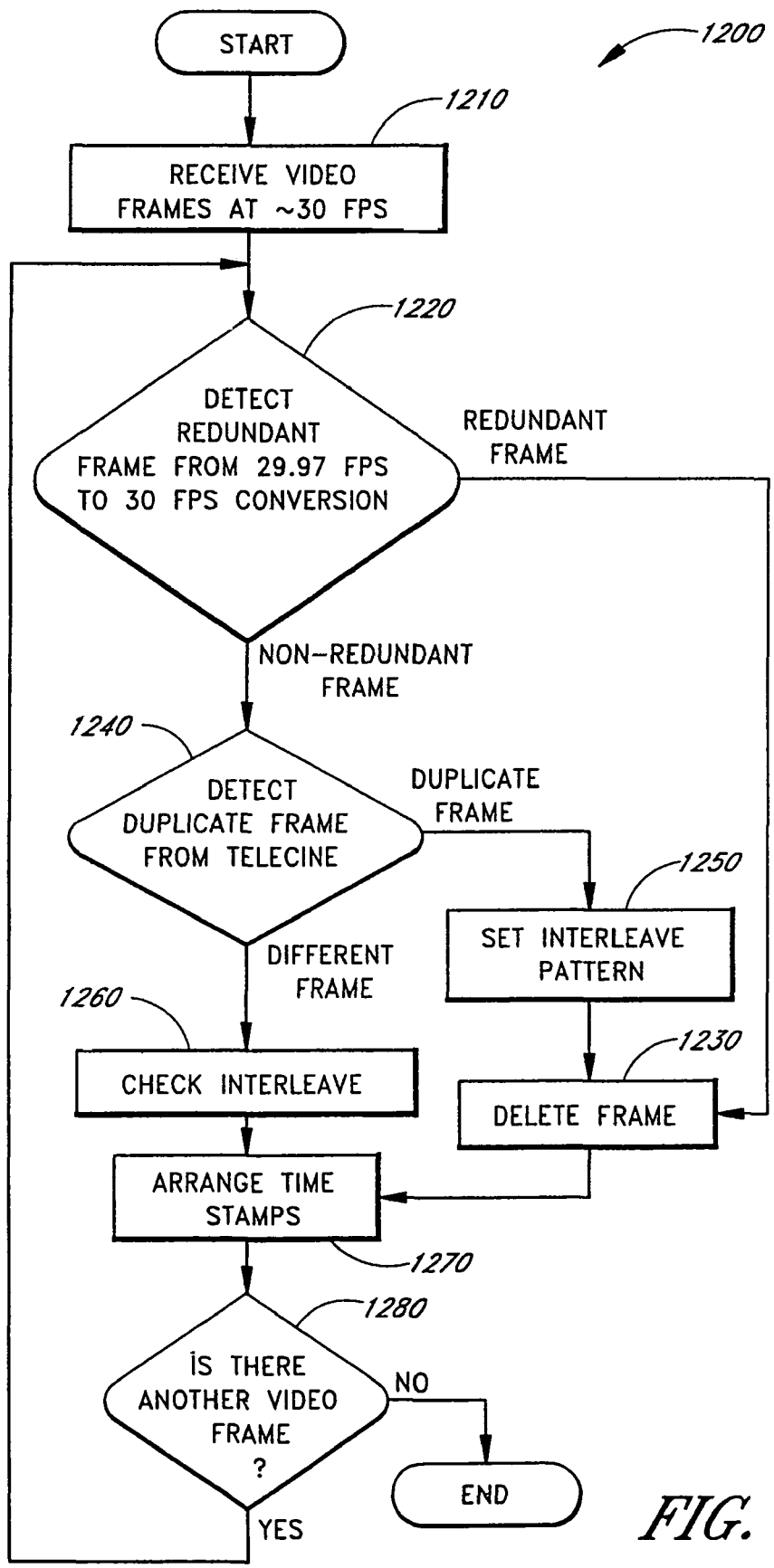
FIG. 12 illustrates an overview inverse telecine process in accordance with an embodiment of the present invention for converting interlaced frames.

FIG. 12 illustrates an overview inverse telecine process 1200 in accordance with an embodiment of the present invention for converting interlaced frames. The inverse telecine process 1200 is similar to the inverse telecine process 500 described in connection with FIG. 5. In State 1210, the process receives video frames at approximately a 30-fps rate, such as a 29.97-fps rate or a 30-fps rate, as described in connection with FIG. 3. The frame rate referred to herein can refer to a real-time frame rate or a calculated frame rate based on a stored video clip. It will also be understood by one of ordinary skill in the art that the frame rate referred to herein applies to an expected frame rate, i.e., the frame rate that is expected in the absence of dropped frames.

In State 1220, the process 1200 detects for redundant video frames that are the result of a conversion from a 29.97-fps video format to a 30-fps video format. As described in connection with FIG. 3, where 29.97-fps video has been converted to 30-fps video, one video frame is additionally copied approximately every 30 seconds. Under typical circumstances, the copy of the video frame is identical to the copied video frame.

Detection of redundant frames by State 1220 can occur substantially as described in connection with State 520 of FIG. 5 and by the process 600 illustrated by FIG. 6. In another embodiment, redundant frames are advantageously detected by comparing the even field of the present frame with the even field of the previous frame, and by comparing the odd field of the present frame with the odd field of the previous frame. In one embodiment, the even field of a frame corresponds to the even lines of the frame and the odd field of the frame corresponds to the odd lines of the frame. By separately computing and maintaining the difference between the even and the odd fields, the results of the comparison can advantageously be re-used to detect video frames that have interlaced disparate film frames, such as video frame $V_3$ shown in FIG. 3.

One embodiment compares every four pixels of the even fields of the present frame and the previous frame, and every four pixels of the odd fields of the present frame and the previous frame, by computing a summation of the squares of the difference between the luminance associated with the compared pixels of each frame. Another embodiment compares both the luminance and the chrominance components of the pixels selected for comparison. One embodiment further normalizes the comparison by dividing the summation of squares difference by the number of compared pixels. Normalization allows one algorithm to reliably detect differences in frames irrespective of the number of lines in the frame. It will be understood by one of ordinary skill in the art that one alternative to normalization is to vary thresholds used for comparison. A further advantage of normalization is that it allows for a simplified capping of large differences.

Of course, rather than comparing every fourth pixel, all the pixels of the frames can be compared, or fewer pixels than every fourth. In one embodiment, the normalized summation of squares is further saturated, for example, limited to a predetermined value such as 100, so that a relatively large difference between two frames does not unduly dominate a standard deviation computation based on a set of comparisons among multiple frames. Where the comparisons are not normalized, one embodiment caps relatively large differences with reference to a variable threshold, which increases with increasing number of lines.

Where a redundant frame exists, the accumulated comparisons, or the summation of squares equals zero and is detected accordingly. Further details of detecting a redundant frame are described above in connection with FIG. 6. However, it will be understood by that the comparison of frames, as indicated by State 610 of FIG. 6, applies to both the even and the odd field of an interleaved frame.

Where a redundant frame is detected by State 1220, the process 1200 proceeds from State 1220 to State 1230, where the redundant frame is removed from the sequence of frames. Where no redundant frame is detected by State 1220, the process 1200 proceeds from State 1220 to State 1240.

In State 1230, the redundant frame is removed from the sequence of frames and the timestamps of the remaining frames adjusted accordingly by proceeding to State 550. In one embodiment, the timestamps of the remaining frames are adjusted after further removal of frames by the inverse telecine process 500.

Detection and deletion of the redundant frames brings the remaining sequence of frames closer to a more consistent 3:2 telecine sequence of frames, thereby preparing the remaining sequence of frames for processing in accordance with an automated inverse telecine technique.

In State 1240, the inverse telecine process 1200 receives frames sequenced at about 29.97 fps in the 3:2 telecine format. In State 1240, the process 500 detects video frames that have captured the same film frame. As shown in FIG. 3, video fields $e_2$ and $e_3$, $o_4$ and $o_5$, $e_7$ and $e_8$, and $o_9$ and $o_{10}$ capture their respective portions of the same film frames, $F_2$, $F_4$, $F_6$, and $F_8$, respectively.

As will be explained in greater detail later, one embodiment of the present invention detects the 3:2 telecine pattern by detecting the 3:2 telecine pattern in the video fields. It will be understood by one of ordinary skill in the art that in a typical system, the system receives video frames from which the video fields of a frame are deduced by examination of alternating lines of the frame.

As shown in FIG. 3, some video fields interlace disparate film frames. On average, 2 out of every 5 video frames are the combination of disparate film frames. As shown in FIG. 3, video frames $V_3$, $V_4$, $V_8$, and $V_9$ capture disparate film frames. For example, video frame $V_3$ is the combination of film frames $F_2$ and $F_3$, video frame $V_4$ is the combination of film frames $F_3$ and $F_4$, video frame $V_8$ is the combination of film frames $F_6$ and $F_7$, and video frame $V_9$ is the combination of film frames $F_7$ and $F_8$.

One embodiment of the present invention re-interlaces the video frames that are composed of disparate film frames. Thus, in the example of FIG. 3, video frames $V_3$, $V_4$, $V_8$, and $V_9$ are modified such that video frame $V_3$ is encoded by video fields $o_3$ and $e_4$, video frame $V_4$ is encoded by video fields $o_4$ and $e_5$, video frame $V_8$ is encoded by video fields $o_8$ and $e_9$, and video frame $V_9$ is encoded by video fields $o_9$ and $e_{10}$. After re-interleaving, which improves the quality of the picture particularly when the two film frames used to encode the original video frame are not related, re-interleaved video frames $V_4$ and $V_9$ capture the same film frames $F_4$ and $F_8$, respectively, as video frames $V_5$ and $V_{10}$.

In one embodiment, video frames fitting the pattern of illustrated video frames $V_5$ and $V_{10}$ are subsequently detected as duplicative of video frames fitting the pattern of illustrated video frames $V_4$ and $V_9$. However, it will be understood by one of ordinary skill in the art that either re-interleaved frames $V_4$ and $V_9$ or video frames $V_5$ and $V_{10}$ can be deleted, which advantageously reduces storage space and bandwidth used to upload or download the video clip. In another embodiment, video frames, such as $V_4$ and $V_9$ in the example, that would be duplicative of existing video frames are not interleaved, but rather deleted. Further details of detection of duplicate frames and re-interleaving of frames are described later in connection with FIGS. 13 to 17.

After a duplicate frame is detected in State 1240, the process proceeds to State 1250, where an interleave pattern is set. Though the 3:2 telecine pattern can be difficult to detect, the 3:2 pattern is predictable and the detection of duplicate video fields can be used to identify which video frames are likely to have interlaced disparate film frames, and which field, even or odd, should be replaced by a field from an adjacent frame, e.g., if odd duplicate fields are detected, even fields are re-interleaved and vice-versa. As will described later in connection with FIGS. 16 and 17, one embodiment optionally re-interleaves frames only after testing that the re-interleaved frame is more coherent than the original frame. The process advances from State 1250 to State 1230.

In State 1230, the identified frame is removed from the sequence and the process advances to State 1280, where the timestamps of the remaining frames are realigned so that the remaining frames are substantially evenly spaced over a 24-fps interval. For example, where the last frame is removed from a 5 frame sub-sequence, the timestamp for the first frame can go unchanged, the timestamp for the second frame can be delayed by about 8 mS, the timestamp for the third frame can be delayed by about 17 mS, and the timestamp for the fourth frame can be delayed by about 25 mS. The process advances from State 1270 to State 1280. In State 1280, the process determines whether there are additional video frames to process and returns to State 1220 to continue the inverse telecine process.

It will be understood by one of ordinary skill in the art that the detection, deletion, and resequencing of redundant frames as shown in FIG. 12 can be performed in real time, as a video stream is received by a server, or can be performed on stored data in a batch process.

Figure 13:
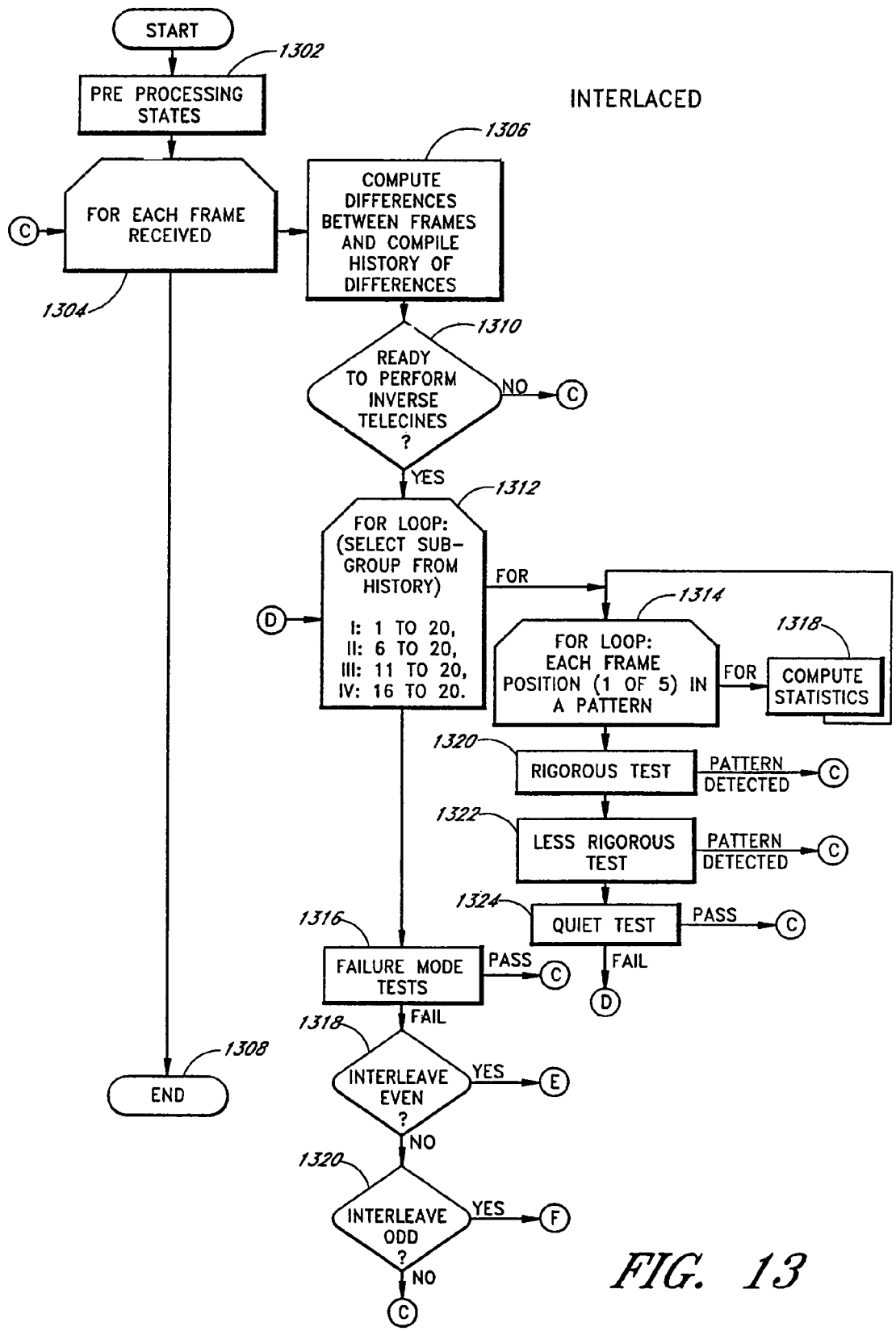
FIG. 13 illustrates an inverse telecine process in accordance with an embodiment of the present invention for converting interlaced frames.

FIG. 13 illustrates an inverse telecine process 1300 in accordance with an embodiment of the present invention for converting interlaced frames. In State 1302, the inverse telecine process 1300 performs pre-processing steps. The pre-processing states include initialization states, verification states such as a verification that the received frame rate is at least 25.5 fps, detection of single field or multiple field encoding of frames as described in State 430 of FIG. 4, and the like. The process 1300 advances from State 1302 to State 1304.

In State 1304, the process 1300 initiates a loop, such as a "for" loop or a "while" loop, to receive and analyze video frames. When a new frame is retrieved, the process advances to State 1306. When the frames have been processed or the desired frames of the sequence have been processed, the process advances to State 1308 and has completed processing of the video sequence.

In State 1306, the process 1300 compares the present frame received with the previous frame received, and the process 1300 compiles a history of the comparisons between frames in a collection in a manner similar to that described in connection with FIG. 9. However, in contrast to the processes 700 and 800 described in connection with FIG. 7 and FIG. 8, the process 1300 compare, computes, and maintains the differences between the fields of the interlaced frames, i.e., compares the even field of the present frame with the even field of the previous frame, etc. In one embodiment, the even and the odd fields are separated from frames by designating alternating lines of a frame to the even field and to the odd field, e.g., lines 0, 2, 4, 6, etc. to the even field and lines 1, 3, 5, 7, etc. to the odd field.

In one example, the collection holds a history of the last 20 frame comparisons. FIG. 8 illustrates a graphical representation of one embodiment of a collection 800, which maintains a history of the last N comparisons. It will be understood by one of ordinary skill in the art that because there are 2 fields per frame, the illustrated collection 800 maintains the history of the last 2N field comparisons. Such comparisons can be calculated by a computation similar to the normalized and saturated summation of squares technique described in connection with State 520 of FIG. 5. Detection and compensation for the presence of dropped frames can be performed substantially as described in connection with FIG. 7. The process 1300 advances from State 1306 to State 1310.

In State 1310, the process 1300 optionally determines whether the process has collected a meaningful sample of data with which to perform the analysis for the inverse telecine process. In one embodiment, State 1310 determines whether the process is ready to proceed with the inverse telecine process by determining that the collection has been filled with historical comparisons, and by determining that the frame rate is at least 25 fps. Where State 1310 determines that the process is not ready for inverse telecine analysis, the process returns to State 1304 to retrieve another frame. Otherwise, the process advances to State 1312.

In State 1312, the process 1300 advantageously initiates a loop to select a sub-group from the history. When State 1312 selects an iteration of the loop, the process proceeds to State 1314. When State 1312 has completed looping, the process proceeds to State 1316.

In the illustrated embodiment, where the collection maintains a history of the latest 20 comparisons between frames (both fields), a first iteration through the loop analyzes the latest 20 comparisons between frames ($H_{20}$ through $H_1$), a second iteration through the loop analyzes the latest 15 comparisons between frames ($H_{20}$ through $H_6$), a third iteration through the loop analyzes the latest 10 comparisons between frames ($H_{20}$ through $H_{11}$), and a final iteration through the loop analyzes the latest 5 comparisons between the frames ($H_{20}$ through $H_{16}$).

As described in connection with FIG. 7, adaptively conforming the inverse telecine process to the history of the comparisons allows an embodiment according to the present invention to advantageously detect telecine patterns where differences between frames are minute, and yet, to advantageously avoid detection of a false telecine pattern where no telecine pattern exists.

In State 1314, the process initiates a further sub-loop to iterate around the frame position in the telecine pattern. A video frame in a 3:2 telecine pattern conforms to one of five possible frame positions within the 3:2 telecine pattern. Where the interleaving of disparate film frames has been removed from the video frames, one of the five possible 3:2 frame positions corresponds to a duplicate frame, which is detected and removed. It will be understood by one of ordinary skill in the art that when it has been determined that two video frames have captured the same film frame, that either of the two video frames detected can be deleted from the video frame sequence.

An iteration through the loop starting at State 1314 initiates a statistical analysis to search for the 3:2 telecine pattern at each variation or frame position of the 3:2 telecine pattern. With multiple field encoded frames, the individual fields are analyzed for the 3:2 telecine pattern thereby allowing detection of the 3:2 telecine pattern for the frames. Such statistical analysis can include computation of a mean, median, variability, standard deviation, and the like. The comparisons computed in State 1306 can include absolute values of differences, summations of squares of differences, etc. One embodiment advantageously normalizes the differences with respect to the number of pixels compared. In one embodiment, the statistical analysis is performed on a summation of squares of differences, where each square of differences is further normalized and saturated to a predetermined value such as 100. In one embodiment, the process divides the historical differences analyzed into four groups for an iteration through the loop.

The four groups divide in accordance to whether a historical difference is associated with the "in-group" or the "out-group," and whether the historical difference is associated with the even field or the odd field. As described in connection with FIG. 7, the "in-group" comprises the differences between fields of frames that correspond to the frame position selected in the iteration of the loop. The "out-group" comprises the differences between the remaining fields of frames. One embodiment of the computation of statistics is described in more detail later in connection with FIG. 14.

In State 1320, the process searches through the collected statistical analysis with a relatively rigorous test to detect one of the 5 possible 3:2 telecine patterns. Where the telecine pattern is detected, the process performs further steps to determine whether to delete the frame from the sequence, to maintain variables to indicate which pattern was the last detected, to maintain variables that track consistency of pattern matching, to determine whether to re-interleave the frame, and the like, and returns to State 1304 to process the next frame. Otherwise, the process proceeds from State 1320 to State 1322. Further details of State 1320 are described later in connection with FIG. 15.

In State 1322, the process searches through the collected statistical analysis with a relatively less rigorous test to detect one of the 5 possible 3:2 telecine patterns. In one embodiment, State 1322 is implemented by substantially the same process 1500 described FIG. 15, but with a different comparison used to detect the telecine pattern. Further details of State 1322 will be described later in connection with FIG. 15.

Where the telecine pattern is detected in State 1322, the process performs further steps to determine whether to delete the frame from the sequence, to maintain variables to indicate which pattern was the last detected, to maintain variables that track consistency of pattern matching, to determine whether to re-interleave the frame, and the like, and returns to State 1304 to process the next frame. Otherwise, the process proceeds from State 1322 to State 1324.

At State 1324, a telecine pattern has not been observed in States 1320 and 1322 for the sub-group size selected in State 1312. A telecine pattern can be difficult to observe where, for example, the frames are relatively static, i.e., do not differ significantly. In State 1324, the process removes a frame consistent with the previously observed telecine patterns to maintain the inverse telecine process. In one embodiment of State 1324, the process removes a frame upon an analysis of the frames for "quietness," analysis of the history for consistency of past removal of frames, and analyzes the collected history to determine whether the history collected comprises a statistically meaningful sample size.

In one embodiment of State 1324, to delete the present frame, the maximum computed difference for a member in the even field "in-group" corresponding to the present frame is less than 13 (as computed by the normalized summation of squares), the maximum computed difference for a member in the odd field "in-group" corresponding to the present frame is also less than 13, the maximum computed difference for a member in the even field "out-group" corresponding to the present frame is also less than 13, the maximum computed difference for a member in the odd field "out-group" corresponding to the present frame is also less than 13, the members of each "in-group" comprises at least 2 actual computed differences, and the members of each "out-group" comprises at least 5 actual computed differences. Where the conditions referenced above are true, the process deletes the present frame from the sequence, aligns the timestamps of the remaining frames according to the 24 fps film rate, and returns to State 1304 to continue processing. Where one of the conditions referenced above is false, the process returns to State 1312 to continue the detection with a smaller group size.

After State 1312 has reached the smallest group size, which is 5 frames in the illustrated embodiment, State 1312 proceeds to State 1316. In one embodiment of State 1316, the process deletes the present frame and realigns the timestamps of the remaining frames upon a favorable comparison between the even field and the odd field of the present frame.

In one example, a favorable comparison is asserted when the following condition is true. The condition of State 1316 is that the present frame and the prior frame were actual frames (as opposed to dropped frames), that the present frame fits the frame removal pattern, that the frame removal pattern has been consistently detected in the past, and that one of the fields (even/odd) of the present frame exhibited at least X % of the difference between the corresponding field of the adjacent frame than the other field (odd/even). Many values can be used for X. In one embodiment, the value of X is about 60. In another embodiment, the value of X ranges from about 30 to about 60.

In one embodiment, the comparison further includes a maximum limit for the computed differences between the present frame and the previous frame. For example, the condition can be further constrained to evaluate whether the comparisons exceeded a maximum value, such as a value of 9 (for the normalized and saturated comparison).

Where the condition is true, State 1316 delete the present frame, re-align the timestamps of the remaining frames of the sequence as necessary, and returns to State 1304 to retrieve and process the next frame. Where the condition referenced above is false, State 1316 proceeds to State 1318.

In State 1318, the process determines whether to check the present film frame for interlacing of disparate film frames with respect to the even field. For example, where the process detects a telecine pattern based on observation of the odd field of the present frame, the telecine process re-interleaves as appropriate the even field of the frames. In one embodiment, the rigorous and the relatively less rigorous tests described in connection with States 1320 and 1322 further include a flag to indicate which field, even or odd, is used to detect the telecine pattern in the present frame. The other field, odd or even, can further be used to detect the telecine pattern in a prior frame.

Where even fields are evaluated, the process proceeds to the process 1600, which is described in greater detail in connection with FIG. 16, and then returns to State 1304 to retrieve and process the next frame. Otherwise, the process proceeds to State 1320.

In State 1320, the process can determine whether to check the present film frame for interlacing of disparate film frames with respect to the odd field. The process can check a flag as described in State 1318, or can proceed to re-interleaving processes for the odd field in an alternative to proceeding with re-interleaving processes for the even field. For example, where the process detects a telecine pattern based on observation of the even field of the present frame, the telecine process re-interleaves as appropriate the odd field of the frames. In one embodiment, the rigorous and the relatively less rigorous tests described in connection with States 1320 and 1322 further include a flag to indicate which field, even or odd, is used to detect the telecine pattern in the present frame. The other field, odd or even, can further be used to detect the telecine pattern in a prior frame.

Where even fields are evaluated, the process proceeds to the process 1700, which is described in greater detail in connection with FIG. 17, and then returns to State 1304 to retrieve and process the next frame. Otherwise, the process simply returns to State 1304 to retrieve and to process the next frame.

The process continues looping in the manner described until the frames of the sequence have been retrieved and processed. When no frames are left for processing, the process proceeds from State 1304 to State 1308 and ends.

Figure 14:
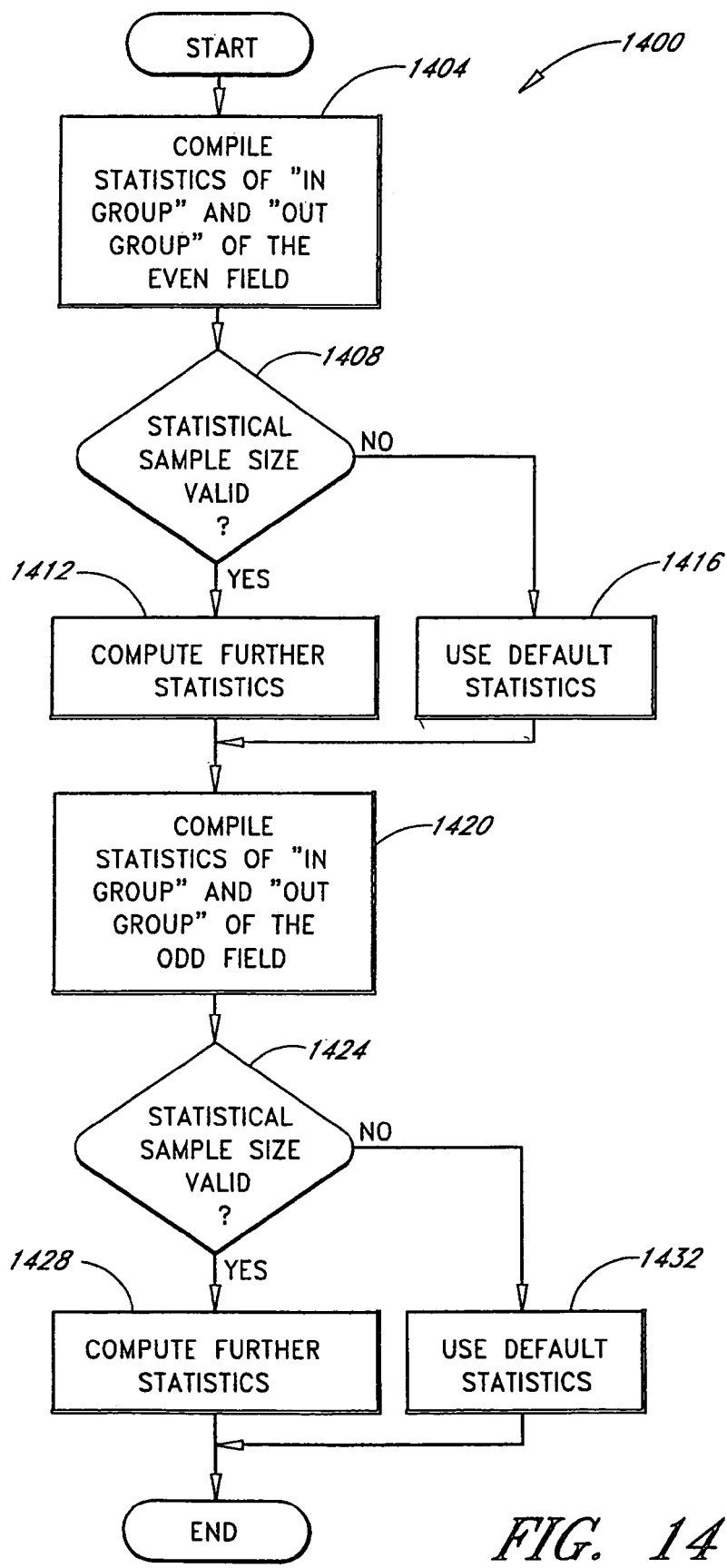
FIG. 14 illustrates a process for performing statistical analysis of differences between fields of interlaced frames.

FIG. 14 illustrates a process 1400, which provides additional details of one embodiment of State 1318 of the process described in connection with FIG. 13.

In State 1404, the process compiles statistics of the collected differences between the even fields of adjacent frames. In one embodiment, State 1314 provides an indication of a frame position pattern (one of the five positions in a 3:2 sequence), and the process compiles an "in-group" and an "out-group" set of statistics for the even fields. In one embodiment, values in the collection corresponding to unknowns due to dropped frames are ignored in the statistical computation. In one embodiment, the computations performed in State 1404 include a summation of the actual (non-unknown) comparisons in the "in-group" and the "out-group," as well as a count of the comparisons in the "in-group" and in the "out-group."

The process advances from State 1404 to State 1408. In State 1408, the process determines whether a statistically significant number of samples were included in the compilation of statistics. The number of samples included in the compilation of statistics depends on the sub-group size specified in State 1412 and on the pattern selected in State 1314, which determines which differences in the collection belong to the "in-group" and which differences in the collection belong to the "out-group."

In one embodiment, the process proceeds from State 1408 to State 1412 when there are at least 2 samples analyzed in the "in-group" and at least 5 samples analyzed in the "out-group." Otherwise, the process proceeds from State 1408 to State 1416.

In State 1412, the process performs further statistical analysis of the comparisons in the "in-group" and in the "out-group." Examples of the further statistical analysis performed include computation of means, variances, and standard deviations of the comparisons in the "in-group" and the "out-group." The process advances from State 1412 to State 1420.

In State 1416, the process substitutes predetermined values for the statistics and can set a flag to indicate that the number of samples in either the "in-group" or the "out-group" is too low to analyze meaningfully. The process advances from State 1416 to State 1420.

In State 1420, the process compiles statistics of the collected differences between the odd fields of adjacent frames. It will be understood by one of ordinary skill in the art that the statistics of the odd fields can be computed before or after the statistics of the even fields. In one embodiment, State 1314 provides an indication of a frame position pattern (one of the five positions in a 3:2 sequence), and the process compiles an "in-group" and an "out-group" set of statistics for the odd fields. In one embodiment, values in the collection corresponding to unknowns due to dropped frames are ignored in the statistical computation. In one embodiment, the computations performed in State 1420 include a summation of the actual (non-unknown) comparisons in the "in-group" and the "out-group," as well as a count of the comparisons in the "in-group" and in the "out-group."

The process advances from State 1420 to State 1424. In State 1424, the process determines whether a statistically significant number of samples were included in the compilation of statistics. The number of samples included in the compilation of statistics depends on the sub-group size specified in State 1428 and on the pattern selected in State 1314, which determines which differences in the collection belong to the "in-group" and which differences in the collection belong to the "out-group."

In one embodiment, the process proceeds from State 1424 to State 1428 when there are at least 2 samples analyzed in the "in-group" and at least 5 samples analyzed in the "out-group." Otherwise, the process proceeds from State 1424 to State 1432.

In State 1428, the process performs further statistical analysis of the comparisons in the "in-group" and in the "out-group." Examples of the further statistical analysis performed include computation of means, variances, and standard deviations of the comparisons in the "in-group" and the "out-group." The process returns from State 1428 to State 1314 for further processing of the next frame pattern.

In State 1432, the process substitutes predetermined values for the statistics and can set a flag to indicate that the number of samples in either the "in-group" or the "out-group" is too low to analyze meaningfully. The process returns from State 1432 to State 1314 for further processing of the next frame pattern.

Figure 15B:
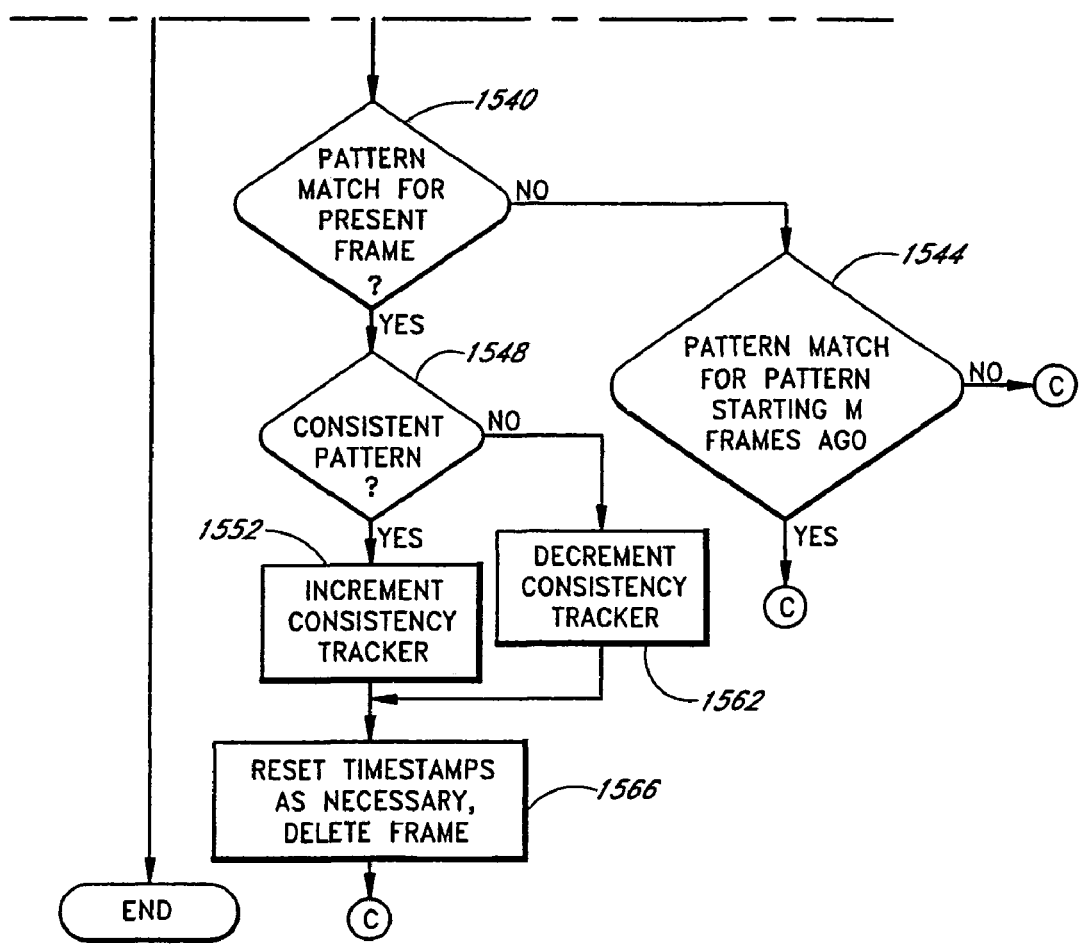
FIG. 15 consists of FIGS. 15A and 15B and illustrates one process according to an embodiment of the present invention of detecting a relatively clear telecine pattern.

FIG. 15 illustrates a process 1500 according to an embodiment of the present invention that can implement State 1320 of the process described in connection with FIG. 13. The illustrated process 1500 detects a relatively clear telecine pattern.

In State 1504, the process initiates a loop to test for a telecine pattern in one of the 5 possible 3:2 patterns in the collection. The process proceeds to State 1508 when there is still at least one pattern to test and a telecine pattern has not yet been detected by the process. The process 1500 proceeds from State 1508 to State 1322 of FIG. 13 when the 5 possible patterns have been tested and no telecine pattern was detected by the process 1500.

In State 1508, the process determines whether there is a statistically sufficient collection of data in the even field "in-group" and the even field "out-group." If, for example, a relatively large number of dropped frames results in less than 2 members in the even field "in-group" or less than 5 members in the even field "out-group," the process proceeds from State 1508 to State 1536 to test the next frame position. Similarly, in State 1508, the process also determines whether there is a statistically sufficient collection of data in the corresponding odd field "in-group" and the corresponding odd field "out-group." The corresponding odd field frame position differs from the even field frame position. In one embodiment, the odd field frame position is the even frame position plus 2 in modulo 5 arithmetic, e.g., even field frame positions (0, 1, 2, 3, 4) translate to odd field frame positions (2, 3, 4, 0, 1). Where a statistically sufficient collection of data resides in the even and odd "in-group" and the even and odd "out-group," one embodiment of the process detects a pattern when the comparisons expressed below are both true:

$$\bar{g}_{ie} + w_i(p) \cdot s_{g_{ie}} < \bar{g}_{oe} - w_o(p) \cdot s_{g_{oe}}$$

and, $$\bar{g}_{io} + w_i(p) \cdot s_{g_{io}} < \bar{g}_{oo} - w_o(p) \cdot s_{g_{oo}}$$

In the first formula expressed above, $\bar{g}_{ie}$ represents a mean or average of the members in the collection belonging to the even "in-group," $w_i(p)$ represents a variable or weighing factor based on the size of the sub-group selected in State 1312, $s_{g_{ie}}$ represents the standard deviation of the members belonging to the even "in-group," $\bar{g}_{oe}$ represents a mean of the members belonging to the even "out-group," $w_o(p)$ represents a variable or weighing factor based on the size of the sub-group selected in State 1312, and $s_{g_{oe}}$ represents the standard deviation of the members belonging to the even "out-group." The variable $w_i(p)$ can be implemented by a lookup table wherein $w_i(p)$ conforms to a value of 3 when the sub-group size is 15 or 20 frames, and a value of 4 when the sub-group size is 5 or 10 frames. Similarly, the variable $w_o(p)$ can be implemented by a lookup table wherein $w_o(p)$ conforms to a value of 1 when the sub-group size is 15 or 20 frames, and a value of 2 when the sub-group size is 5 or 10 frames.

In the second formula expressed above, $\bar{g}_{io}$ represents a mean or average of the members in the collection belonging to the odd "in-group," $w_i(p)$ represents a variable or weighing factor based on the size of the sub-group selected in State 1312, $s_{g_{io}}$ represents the standard deviation of the members belonging to the odd "in-group," $\bar{g}_{oo}$ represents a mean of the members belonging to the odd "out-group," $w_o(p)$ represents a variable or weighing factor based on the size of the sub-group selected in State 1312, and $s_{g_{oo}}$ represents the standard deviation of the members belonging to the odd "out-group." The variables $w_i(p)$ and $w_o(p)$ can be implemented by the same lookup tables described above.

Where the formulas expressed above are both trues, the process proceeds from State 1508 to State 1512. Otherwise, the process proceeds from State 1508 to State 1536.

In State 1512, the process ascertains whether the even field frame position (the detected frame position) of the telecine pattern found in State 1508 corresponds to the frame position of the present frame. Where the even field frame position of the telecine pattern fails to match the present frame position, the process proceeds from State 1512 to State 1516. Where the even field frame position of the telecine pattern matches the present frame position, the process proceeds from State 1512 to State 1520.

In State 1516, the process determines whether the detected even field frame position telecine pattern corresponds to a frame position that is the frame position prior to the present frame. If the detected frame position is the frame position prior to the present frame, the process proceeds to an interleave process to interleave the odd field of the present frame. Further details of interleaving the odd field are described later in connection with FIG. 17. Otherwise, the process returns to State 1304 of FIG. 13 to retrieve the next frame.

States 1520, 1524, 1528, and 1532 of FIG. 15 are similar to States 1116, 1120, 1124, and 1128 respectively, of FIG. 11.

In State 1520, the process compares the timestamp of the previously removed frame to determine whether the inverse telecine process is identifying the extra frame of telecine pattern consistently, i.e., about 5 frames apart (about every 167 mS). In one embodiment, where the frame identified for is consistent with the previously removed frame, the process proceeds to State 1524, where a counter is incremented to measure the consistency of removal of frames. The process advances from State 1524 to State 1532. Where the frame identified for removal fails to follow is not consistent with the previously removed frame, the proceeds to State 1528, where the counter is decremented. The process advances from State 1528 to State 1532. In State 1532, the process removes the present frame, and realigns the timestamps of the remaining frames in accordance with the 24-fps film frame timeline. The process returns from State 1532 to State 1304 to retrieve the next video frame.

State 1536 is substantially similar to State 1508, except that the roles of the even fields and the odd fields are reversed. In State 1508, the frame position corresponds to the odd field, and the corresponding even field frame position is the odd field frame position plus 2 in modulo 5 arithmetic. Again, the process determines whether there is a statistically sufficient collection of data in the odd and the even field "in-group" and "out-group." Where a statistically sufficient collection of data resides in the even and odd "in-group" and the even and odd "out-group," one embodiment of the process detects a pattern when the comparisons expressed below are both true:

$$\bar{g}_{io} + w_i(p) \cdot s_{g_{io}} < \bar{g}_{oo} - w_o(p) \cdot s_{g_{oo}}$$

and, $$\bar{g}_{ie} + w_i(p) \cdot s_{g_{ie}} < \bar{g}_{oe} - w_o(p) \cdot s_{g_{oe}}$$

In one embodiment, the variables used in the expressions above relate to the same quantities described in connection with State 1508, but with the odd field corresponding to the tested frame position as defined by State 1504 and the even field corresponding to the frame position plus 2 in modulo 5 arithmetic.

Where the conditions are not satisfied, the process returns from State 1536 to State 1504 to test another frame position. Where the conditions are satisfied, the process proceeds from State 1536 to State 1540.

In State 1540, the process ascertains whether the odd field frame position (the detected frame position) of the telecine pattern found in State 1508 corresponds to the frame position of the present frame. Where the odd field frame position of the telecine pattern fails to match the present frame position, the process proceeds from State 1540 to State 1544. Where the odd field frame position of the telecine pattern matches the present frame position, the process proceeds from State 1544 to State 1552.

In State 1544, the process determines whether the detected odd field frame position telecine pattern corresponds to a frame position that is the frame position prior to the present frame. If the detected frame position is the frame position prior to the present frame, the process proceeds to an interleave process to interleave the even field of the present frame. Further details of interleaving the even field are described later in connection with FIG. 16. Otherwise, the process returns to State 1304 of FIG. 13 to retrieve the next frame.

In State 1552, the process compares the timestamp of the previously removed frame to determine whether the inverse telecine process is identifying the extra frame of telecine pattern consistently, i.e., about 5 frames apart (about every 167 mS). In one embodiment, where the frame identified for is consistent with the previously removed frame, the process proceeds to State 1552, where a counter is incremented to measure the consistency of removal of frames. The process advances from State 1552 to State 1566. Where the frame identified for removal fails to follow is not consistent with the previously removed frame, the proceeds to State 1562, where the counter is decremented. The process advances from State 1562 to State 1566. In State 1566, the process removes the present frame, and realigns the timestamps of the remaining frames in accordance with the 24-fps film frame timeline. The process returns from State 1566 to State 1304 to retrieve the next video frame.

In one embodiment, States 1508 and 1536 are configured such that only one of State 1508 or State 1536 will detect a telecine sequence in a video clip that is encoded in a consistent manner. It will be understood by one of ordinary skill in the art that although both the even fields and the odd fields will exhibit a telecine pattern, on average, only one frame per five frames should be deleted from the video clip.

A modified version of the illustrated process 1500 can also be used to implement State 1322 of the process shown in FIG. 13. In one embodiment, State 1322 is implemented by substantially the same process as the illustrated process 1500, but with different comparisons for States 1508 and 1536 that are used to detect the telecine pattern.

In one embodiment of State 1322, the process performs a first comparison of the even field "in-group" mean, a parameter based on the size of the sub-group selected in State 1312, and the standard deviation of the even field "in-group" data, with a second quantity dependent on a minimum value of data from the even field "out-group." The formula expressed below embodies one such comparison for the first comparison of modified State 1508:

$$\bar{g}_{ie} + w_i(p) \cdot s_{g_{ie}} < n_{oe}$$

In the formula expressed above, $\bar{g}_{ie}$ represents a mean or average of the members of the collection of differences belonging to the even field "in-group," $w_i(p)$ represents a variable or weighing factor based on the size of the sub-group selected in State 1312, $s_{g_{ie}}$ represents the standard deviation of the members belonging to the even field "in-group," and $n_{oe}$ represents the minimum value of a member in the even field "out-group" (notwithstanding values inserted as unknowns). The variable $w_i(p)$ can be implemented by a lookup table wherein $w_i(p)$ conforms to a value of 3 when the sub-group size is 15 or 20 frames, and a value of 4 when the sub-group size is 5 or 10 frames.

The formula expressed below embodies a second comparison that can be used in modified State 1508. The second comparison is based on an analysis of the characteristics of the odd fields. The frame position for the odd field frame comparisons is offset from the even field frame position by 2 frame positions in modulo 5 arithmetic.

$$\bar{g}_{io} + w_i(p) \cdot s_{g_{io}} < n_{oo}$$

In the formula expressed above, $\bar{g}_{io}$ represents a mean or average of the members of the collection of differences belonging to the odd field "in-group," $w_i(p)$ represents a variable or weighing factor based on the size of the sub-group selected in State 1312, $s_{g_{io}}$ represents the standard deviation of the members belonging to the odd field "in-group," and $n_{oo}$ represents the minimum value of a member in the odd field "out-group" (notwithstanding values inserted as unknowns). The variable $w_i(p)$ can again be implemented by a lookup table wherein $w_i(p)$ conforms to a value of 3 when the sub-group size is 15 or 20 frames, and a value of 4 when the sub-group size is 5 or 10 frames.

In a similar manner, the comparisons expressed in the formulas above can be used to in one embodiment of State 1322 to implement a modified State 1536. In the modified State 1536, the roles of the even and the odd field frame positions are reversed from the modified State 1508, as described in connection with State 1536 of FIG. 15.

Figure 16:
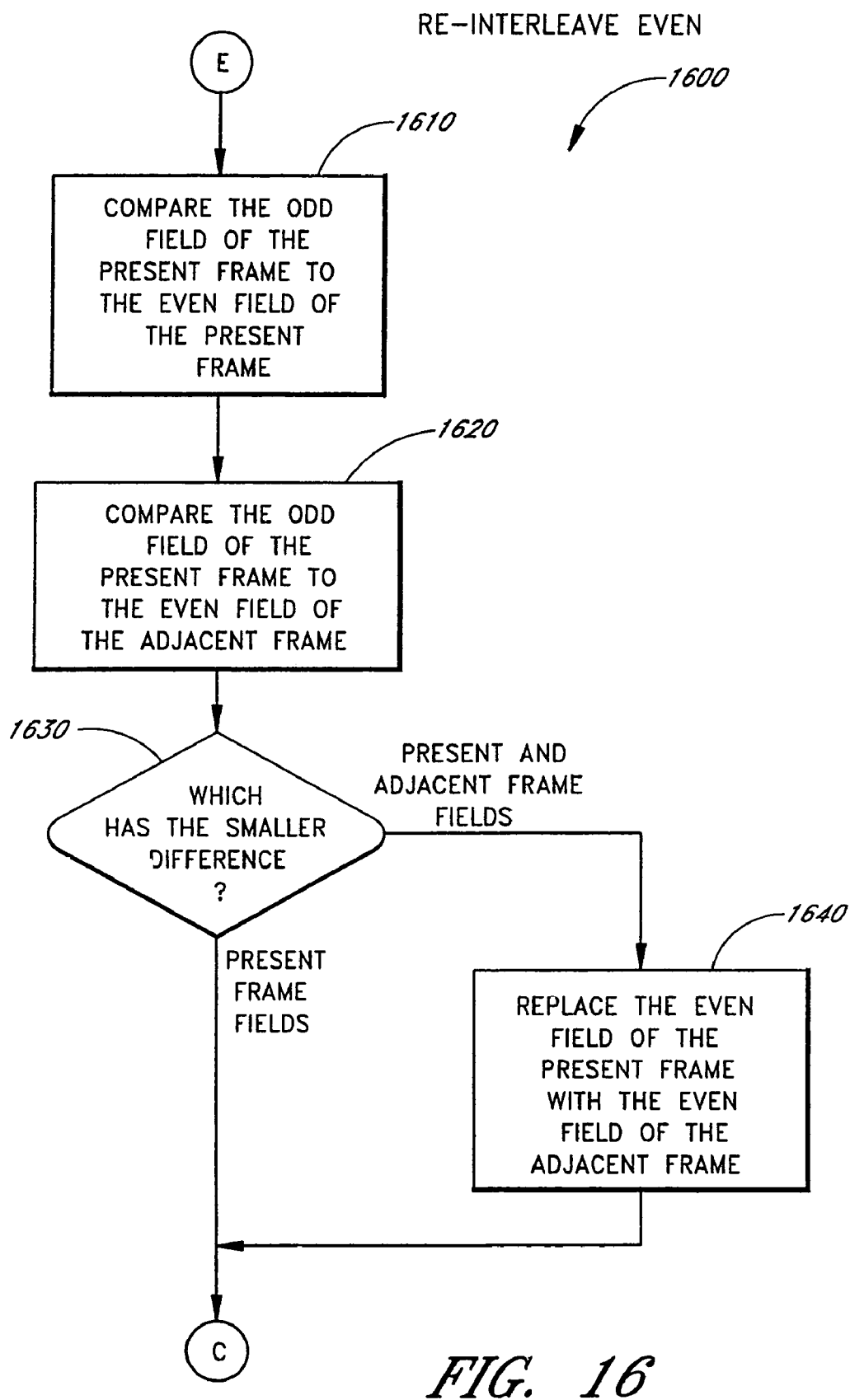
FIG. 16 illustrates a process for re-interleaving frames.

FIG. 16 illustrates a process 1600 for re-interleaving even fields of frames. In State 1610, the process compares the odd field of the present frame with the even field of the present frame. It will be understood by one of ordinary skill in the art that the comparison can be performed on each pixel in the frame, where each pixel from the odd field is compared with the adjacent pixel in the even field, or can be performed periodically, such as on every fourth pixel. Similarly, it will be understood that the comparison can involve both the luminance and the chrominance information associated with the pixels, or only one, such as the luminance information. The process advances from State 1610 to State 1620.

In State 1620, the process compares the odd field of the present frame with the even field of the adjacent frame. For example, with reference to FIG. 3, an embodiment according to the present invention compares an odd field $o_8$ of the present frame $V_8$, with the even field $e_9$ of an adjacent frame $V_9$. The process advances from State 1620 to State 1630.

In State 1630, the process compares the results of the comparisons made in States 1610 and 1620. If the comparison in State 1620 indicates less of a difference between the odd field of the present frame and the even field of the adjacent frame than the comparison in State 1610 between the even and the odd fields of the present frame, the process proceeds from State 1630 to State 1640, where the even field of the adjacent frame is copied to the even field of the present frame to re-interleave the present frame, and returns to State 1304 to retrieve the next frame. If, however, the comparison in State 1610 indicates that the fields of the present frame are more similar than the odd field of the present frame and the even field of the adjacent frame as indicated by State 1620, then the process does not re-interleave the frame and returns to State 1304 to retrieve the next frame.

Figure 17:
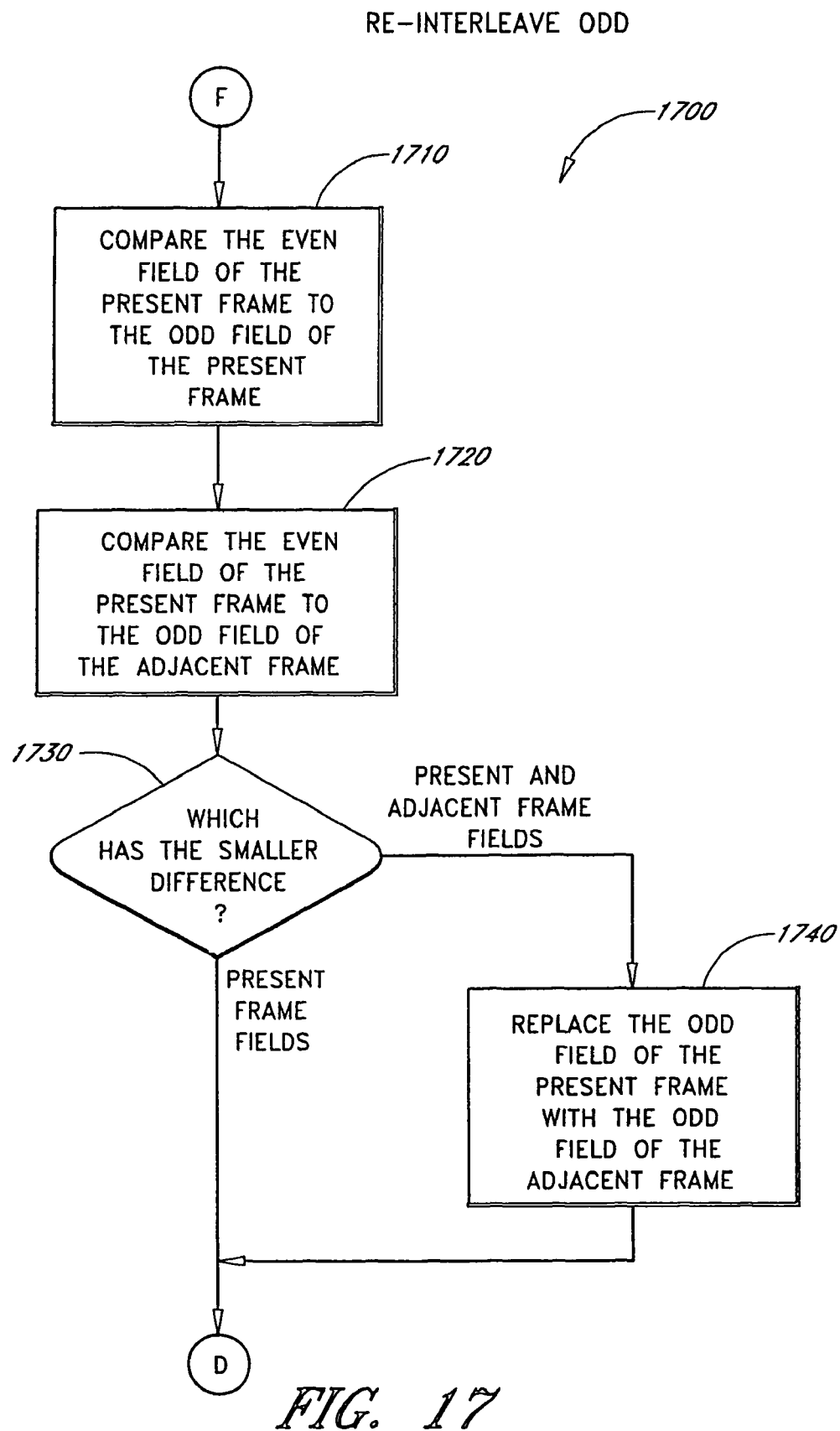
FIG. 17 illustrates another process for re-interleaving frames.

FIG. 17 illustrates a process 1700 for re-interleaving odd fields of frames. In State 1710, the process compares the even field of the present frame with the odd field of the present frame. The process advances from State 1710 to State 1720.

In State 1720, the process compares the even field of the present frame with the odd field of the adjacent frame. The process advances from State 1720 to State 1730.

In State 1730, the process compares the results of the comparisons made in States 1710 and 1720. If the comparison in State 1720 indicates less of a difference between the even field of the present frame and the odd field of the adjacent frame than the comparison in State 1710 between the even and the odd fields of the present frame, the process proceeds from State 1730 to State 1740, where the odd field of the adjacent frame is copied to the odd field of the present frame to re-interleave the present frame, and returns to State 1304 to retrieve the next frame. If, however, the comparison in State 1710 indicates that the fields of the present frame are more similar than the odd field of the present frame and the even field of the adjacent frame as indicated by State 1720, then the process does not re-interleave the frame and returns to State 1304 to retrieve the next frame.

Embodiments of the present invention obviate the effects of a telecine process, wherein additional frames are added to accomplish the frame rate conversion, without the need for user intervention. The differences between pixels of adjacent frames are computed and collected, a statistical analysis of the differences is performed to detect a telecine pattern and identify duplicate frames, and the duplicate frames are removed from the sequence. Advantageously, the techniques disclosed herein can be used with video sequences with interlaced or non-interlaced frames, and/or of various resolutions.

Although this invention has been described above in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A computer implemented method of detecting a telecine pattern embedded within a first-sequence of video frames, the method comprising:
    a computer receiving at least a portion of the frames from the first-sequence of video frames;
    the computer measuring a plurality of differences between frames and their adjacent frames in the sequence and storing the measured differences;
    the computer associating the measured differences into a plurality of data groups according to predicted telecine patterns; and
    the computer performing a statistical analysis of the plurality of data groups.

2. The method as defined in claim 1, wherein the measurement of the differences between frames includes comparing every fourth pixel of a first frame to every fourth pixel of a second frame.

3. The method as defined in claim 1, wherein the measurement of the differences between frames includes computing a summation of an absolute sum of differences between pixels.

4. The method as defined in claim 1, wherein the measurement of the differences between frames includes computing a summation of the square of the differences between pixels.

5. The method as defined in claim 1, wherein the measurement of the differences between frames is further normalized according to a number of pixels per frame that are compared.

6. The method as defined in claim 1, wherein the measurement of the differences between frames is further saturated to a predetermined level.

7. The method as defined in claim 1, further comprising:
    maintaining the stored differences in a collection;
    shifting the stored differences in the collection in response to a new measurement of differences between frames; and
    adding the new measurement of differences to the collection.

8. The method as defined in claim 1, wherein the statistical analysis includes a computation of a mean.

9. The method as defined in claim 1, wherein the statistical analysis includes a computation of a variance.

10. The method as defined in claim 1, wherein the statistical analysis includes a computation of a standard deviation.

11. The method as defined in claim 1, further comprising varying a sample size of the measured differences analyzed in the plurality of data groups in response to a failure to detect the telecine pattern in a larger portion.

12. The method as defined in claim 1, further comprising varying a threshold used for detection of the telecine pattern at least in part based on a selected sample size.

13. The method of claim 1, wherein the steps of measuring the plurality of differences, associating the measured differences into data groups, and performing statistical analysis are performed substantially without human intervention.

14. A system that detects a telecine pattern embedded within a first sequence of video frames, the system comprising:
    a server adapted to receive at least a portion of the frames from the first sequence of video frames;
    means for measuring a plurality of differences between frames and their adjacent frames in the sequence and storing the measured differences;
    means for associating the measured differences into a plurality of data groups according to predicted telecine patterns; and
    means for performing a statistical analysis of the plurality of data groups.

15. The system as defined in claim 14, wherein the means for measuring a plurality of differences between frames includes means for comparing every fourth pixel of a first frame to every fourth pixel of a second frame.

16. The system as defined in claim 14, wherein the measurement of the differences between frames includes means for computing a summation of an absolute sum of differences between pixels.

17. The system as defined in claim 14, wherein the statistical analysis includes a computation of a variance.

18. A non-transitory computer-readable medium carrying computer-executable instructions, the computer executable instructions comprising:
    a module with instructions configured to receive at least a portion of the frames from the first sequence of video frames;
    a module with instructions configured to measure a plurality of differences between frames and their adjacent frames in the sequence and storing the measured differences;
    a module with instructions configured to associate the measured differences into a plurality of data groups according to predicted telecine patterns; and
    a module with instructions configured to perform a statistical analysis of the plurality of data groups.

19. The non-transitory computer-readable medium carrying computer executable instructions as defined in claim 18, wherein the module with instructions configured to measure the plurality of differences between frames includes instructions for computing a summation of an absolute sum of differences between pixels.

20. The non-transitory computer-readable medium carrying computer executable instructions as defined in claim 18, wherein the statistical analysis includes a computation of a variance.

21. The non-transitory computer-readable medium carrying computer executable instructions as defined in claim 18, wherein the statistical analysis includes a computation of a standard deviation.

22. A method for performing inverse telecine conversion, comprising:
    receiving a first sequence of input video frames through a data interface;

buffering or storing the first sequence of input video frames on a computer memory or storage device;

reading sequential pairs of input video frames from the memory or storage device and measuring differences between the sequential pairs within the first sequence of input video frames to produce a first sequence of differences;

associating the first sequence of differences into a plurality of data groups according to predicted telecine patterns; and statistically analyzing at least one data group to determine a first telecine pattern of inserted frames.

23. The method for performing inverse telecine conversion of claim 22, further comprising:

removing the inserted frames from the buffered or stored first sequence of video frames to produce a first sequence of output video frames.

24. The method for performing inverse telecine conversion of claim 22, further comprising:

receiving a second sequence of input video frames through the data interface;

buffering or storing the second sequence of input video frames on the computer memory or storage device;

reading sequential pairs of the second sequence of input video frames from the memory or storage device and measuring differences between sequential pairs within the second sequence of input video frames to produce a second sequence of differences;

statistically analyzing the second sequence of differences to determine a second telecine pattern of inserted frames; and comparing the second telecine pattern to the first telecine pattern to determine if the patterns have the same pattern.

25. The method for performing inverse telecine conversion of claim 24, further comprising:

if the first and second sequences of video frames have the same telecine patterns, combining the first and second sequences of input video frames to produce a new first sequence of input video frames; and repeating the steps of claim 24 with the new first telecine pattern and a new second telecine pattern corresponding to a new second sequence of video frames.

26. The method for performing inverse telecine conversion of claim 24, further comprising:

if the first and second sequences of video frames do not have both the same pattern, repeating the steps of receiving, measuring, and statistically analyzing of claim 24 with at least one additional third sequence of video frames; and statistically comparing the at least one additional third telecine pattern to the first and second telecine patterns to determine if the first, second and at least one third sequences of video frames have the same patterns.

27. The method for performing inverse telecine conversion of claim 26, further comprising:

if statistically comparing the at least one additional third telecine pattern to the first and second telecine patterns results in a conclusion that the first, second, and third telecine patterns have the same patterns, combining the first, second, and at least one third sequences of input video frames to produce a new first sequence of input video frames.

28. The method for performing inverse telecine conversion of claim 24, further comprising:

if the first and second telecine patterns do not have the same pattern, determining a frame or group of frames where the telecine pattern or phase changed; and using the second telecine pattern as the new first telecine pattern starting with the frame or group of frames where the telecine pattern changed.

29. The method for performing inverse telecine conversion of claim 28, further comprising:

repeating the steps of claim 24 with the new first telecine pattern and a new second telecine pattern corresponding to a new second sequence of video frames.

30. A method for performing inverse telecine conversion on a computer to depopulate frames from a stream of frames, comprising:

receiving a stream of video frames via a data interface;

generating a frame difference stream including a stream of differences between adjacent video frames;

associating a portion of the frame difference stream into a plurality of data groups according to predicted telecine patterns;

applying a plurality of tests to at least one data group to determine an embedded telecine pattern;

removing redundant frames from the stream of video frames to produce a non-telecine stream of video frames; and outputting or storing the non-telecine stream of video frames.

31. The method for performing inverse telecine conversion of claim 30, wherein the plurality of tests include at least a rigorous test and a less rigorous test for telecine pattern matching.

32. The method for performing inverse telecine conversion of claim 31, wherein the rigorous test includes attempting to decode one of five possible 3:2 telecine patterns.

33. A non-transitory computer-readable medium carrying computer-executable instructions comprising:

a module with instructions configured to receive a first sequence of input video frames;

a module with instructions configured to measure differences between sequential pairs within the first sequence of input video frames to produce a first sequence of differences;

a module with instructions configured to associate the measured differences into a plurality of data groups according to predicted telecine patterns; and a module configured to statistically analyze at least one data group to determine a first telecine pattern of inserted frames.

34. The non-transitory computer-readable medium carrying computer-executable instructions of claim 33, further comprising:

a module configured to remove the inserted frames to produce a first sequence of output video frames.

35. The non-transitory computer-readable medium carrying computer-executable instructions of claim 33 wherein the first telecine pattern includes a first phase, and further comprising:

a module configured to receive a second sequence of input video frames;

a module configured to measure differences between sequential pairs within the second sequence of input video frames to produce a second sequence of differences;

a module configured to statistically analyze the second sequence of differences to determine a second telecine pattern of inserted frames, the second telecine pattern including a second phase; and a module configured to compare the second telecine pattern to the first telecine pattern to determine if the patterns have the same pattern and phase.

36. A non-transitory computer-readable medium carrying computer-executable instructions for performing inverse telecine conversion to depopulate frames from a stream of frames, comprising:
- a module configured to receive a stream of video frames a module configured to generate a frame difference stream including a stream of differences between adjacent video frames;
- a module with instructions configured to associate the differences into a plurality of data groups according to predicted telecine patterns;
- a module configured to apply a plurality of tests to at least one data group to determine an embedded telecine pattern; and
- a module configured to remove redundant frames from the stream of video frames.

37. The non-transitory computer-readable medium carrying computer-executable instructions for performing inverse telecine conversion of claim 36, wherein the module configured to apply the plurality of tests includes at least a rigorous test and a less rigorous test for telecine pattern matching.

38. The non-transitory computer-readable medium carrying computer-executable instructions for performing inverse telecine conversion of claim 37, wherein the rigorous test includes attempting to decode one of five possible 3:2 telecine patterns.

* * * * *